US005328727A

United States Patent [19]

Kashio et al.

[11] Patent Number: 5,328,727

[45] Date of Patent: Jul. 12, 1994

[54] FLASH THERMAL TRANSFER METHOD AND FLASH THERMAL TRANSFER APPARATUS FOR PRACTICING THE METHOD

[75] Inventors: Yukio Kashio, Tokyo; Yasuo Genba, Akigawa, both of Japan

[73] Assignee: Casio Computer Co., Ltd., Tokyo, Japan

[21] Appl. No.: 927,794

[22] Filed: Aug. 10, 1992

Related U.S. Application Data

[63] Continuation of Ser. No. 675,047, Mar. 25, 1991, abandoned, which is a continuation of Ser. No. 366,732, Jun. 15, 1989, abandoned.

[30] Foreign Application Priority Data

| | | | |
|---|---|---|---|
| Jun. 17, 1988 | [JP] | Japan | 63-148167 |
| Aug. 23, 1988 | [JP] | Japan | 63-207324 |
| Oct. 31, 1988 | [JP] | Japan | 63-273351 |
| Oct. 31, 1988 | [JP] | Japan | 63-273354 |

[51] Int. Cl.[5] .......... B05D 3/06; B44C 1/165; B32B 31/00; H01M 6/04

[52] U.S. Cl. .......... 427/595; 427/557; 427/282; 156/230; 156/272.2; 156/272.8; 430/200; 430/254

[58] Field of Search .......... 427/557, 558, 595, 256, 427/282; 156/230, 273.7, 272.2, 272.8, 244, 17; 430/200, 254

[56] References Cited

U.S. PATENT DOCUMENTS

| | | | |
|---|---|---|---|
| 3,384,015 | 5/1968 | Neuman | 427/56.1 |
| 3,481,760 | 12/1969 | Clark et al. | 427/56.1 |
| 4,091,727 | 5/1978 | Hasegawa et al. | 156/229 |
| 4,315,643 | 2/1982 | Tokunuga et al. | 427/153 |
| 4,582,777 | 4/1986 | Fischer et al. | 430/271 |
| 4,829,049 | 5/1989 | Murata et al. | 428/195 |
| 5,006,447 | 4/1991 | Umeda et al. | 430/272 |
| 5,262,275 | 11/1993 | Fan | 430/273 |

OTHER PUBLICATIONS

Research Disclosure, No. 135, Jul. 1975, Havant, Hampshire, UK, pp. 77–89; anon; "Exposure and heat development device".

Patent abstracts of Japan, vol. 11, No. 111 (M–578) (2558) Apr. 8, 1987 & JP–A–61 255892 (Matsushita Electric Ind Co LTD, Nov. 13, 1986.

Patent abstracts of Japan, vol. 11, No. 238, (M–613) (2685) Aug. 5, 1987, & JP–A–62 51491 (Mita Ind Co Ltd) Mar. 6, 1987.

Patent abstracts of Japan, vol. 8, No. 201 (M–325) (1638) Sep. 14, 1984, & JP–A–59 91093 (Ricoh K.K.) May 25, 1984.

*Primary Examiner*—Marianne Padgett

*Attorney, Agent, or Firm*—Frishauf, Holtz, Goodman & Woodward

[57] ABSTRACT

An image formed by an arbitrary method, can be reproduced on an object (to which image transfer is performed) having a three-dimensional arcuated surface, e.g., a cylindrical object. An original plate sheet is prepared by forming an image on a transparent sheet by using an ink containing carbon. A transfer ink sheet having a hot-melt ink layer formed on its one surface and a reflecting layer formed on its other surface is placed on an object to which image transfer is performed. A cushion member having transparency is placed on the transfer ink sheet, and a transparent plate is stacked on the cushion member. When the transparent plate is urged against the object side, the cushion member is compressed. As a result, the original plate sheet is deformed along the outer surface shape of the object and is brought into tight contact therewith. A flash lamp is turned on in this state. An image portion absorbs infrared rays emitted from the flash to generate heat. Light radiated on portions other than the image portion is reflected by the reflecting layer. For this reason, only a portion of the hot-melt ink layer corresponding to the image portion is melted and is transferred onto the object. The image on the original plate sheet can be also formed in this manner.

6 Claims, 21 Drawing Sheets

FLASH THERMAL TRANSFER METHOD AND FLASH THERMAL TRANSFER APPARATUS FOR PRACTICING THE METHOD

This application is a continuation of application Ser. No. 07/675,047, filed Mar. 25, 1991, (now abandoned) which is a continuation of Ser. No. 07/366,732 filed Jun. 15, 1989 (now abandoned).

BACKGROUND OF THE INVENTION

1. Field of the Invention

The present invention relates to a flash thermal transfer method of thermally transferring a melt ink layer onto a transfer medium by flashing a flash lamp and a flash thermal transfer apparatus for practicing the method.

2. Description of the Related Art

According to a known conventional transfer method, a stencil original is prepared by flashing a flash lamp, and hot melt ink is coated on the stencil original so as to transfer part of the hot melt ink corresponding to perforated portions of the stencil original onto a transfer medium.

A flash thermal transfer apparatus used for such transfer method has a pivot case mounted on its main body. A flash lamp is mounted on this pivot case, and a press plate having a cushion member is arranged on the main body. The flash lamp is arranged in a light source chamber of the pivot case. An opening is formed in one surface (opposing the press plate) of the light source chamber. A transparent glass is attached to the opening. The cushion member is designed to cause the entire surfaces of a stencil original plate and an original or an original and a transparent sheet to be uniformly brought into tight contact with each other upon transfer.

when transfer is to be performed by using such a flash transfer apparatus, a stencil original plate is mounted on the outer surface of the transparent glass, and an original is placed on the cushion member of the press plate. The pivot case is then pivoted to sandwich the stencil original plate and the original between the transparent glass and the cushion member. In this state, the flash lamp is flashed to thermally melt portions of the stencil original plate corresponding to an image of the original, thereby forming an image as perforated portions. Subsequently, ink is squeezed from an ink tube in which hot melt ink is filled and is coated on another sheet, and the sheet is stacked on the inner surface of the original plate and is mounted on the transparent glass.

At the same time, a recording sheet is arranged on the cushion of the press plate, and the pivot case is pivoted in the same manner as described above so as to cause the original plate and the recording sheet to be arranged between the transparent glass and the cushion member and be brought into tight contact therewith. When the flash lamp is turned on in this state, an image corresponding to the image of the original plate is transferred onto the recording sheet, thus obtaining a copy.

In a method using the above-described apparatus, fine lines can not be reproduced faithfully to the image on an original, since a stencil plate has a stencil which has a perforative pattern corresponding to the image and formed by thermally melting a film, and this perforative pattern inevitably expands toward a peripheral portion of the image. In other words, the resolution is degraded.

In addition, when hot melt ink is coated on a stencil original plate and the hot melt ink is thermally transferred, operator's hands tend to be smeared with the ink and so does a transfer medium. Hence, this operation is difficult.

Moreover, a cushion member and a transparent glass are respectively arranged on the lower and upper surface sides of a transfer medium, so that transfer is performed by sandwiching the transfer medium between the transparent glass and the cushion member. This operation is very inefficient, and the transfer apparatus is increased in size and cost. The most significant drawback of the transfer method of sandwiching a transfer medium between a transparent glass and a cushion member is that a transfer medium is limited to paper and films.

SUMMARY OF THE INVENTION

It is an object of the present invention to provide a flash thermal transfer method capable of increasing the resolution of transfer, preventing smear with transfer ink, and easily transferring ink onto a recording medium other than films or a recording medium having an arcuated surface, and a flash thermal transfer apparatus for practicing the method.

In order to achieve the above object, there is provided a flash thermal transfer method comprising the steps of: providing an object on which image transfer is to be performed, and placing, on the object, a transfer ink sheet having a hot-melt ink layer formed on one surface thereof and a reflecting layer on the other surface thereof, and bringing the hot-melt mix layer into contact with the object. A light-transmissive original sheet is provided which has on a surface thereof an ink image formed of material with excellent infrared rays absorbing properties. The surface of the original sheet is placed on the transfer ink sheet, a light-transmissive cushion member capable of being elastically compressed is placed on the original sheet, and a light-transmissive plate is placed on the cushion member. The cushion member is compressed by applying an external force to the light-transmissive plate. A flash lamp is caused to flash from above the plate while the transfer ink sheet is in contact with the object, thereby causing a hot-melt ink image corresponding to the ink image formed on the original sheet to be melted and transferred onto the object.

According to the present invention, there is provided a flash thermal transfer apparatus comprising:

a case having a power source battery storage chamber and a light source chamber in which an opening is formed;

a transparent member formed on the opening of the case;

a flash lamp arranged in the light source chamber;

a power source battery, arranged in the power source battery storage chamber, for causing the flash lamp to a flash;

a cushion member fixed on an outer surface of the transparent member and having transparency; and lock means for holding an original plate sheet on the cushion member.

BRIEF DESCRIPTION OF THE DRAWINGS

FIGS. 1 to 20 are views showing a first embodiment of the present invention, in which FIG. 1 is a perspective view showing an outer appearance of a flash thermal transfer apparatus, FIG. 2 is a perspective view showing a state wherein a holder is detached from a main body of the apparatus, FIG. 3 is a sectional view of the flash transfer apparatus from which the holder is detached, FIG. 4 is a sectional view of the apparatus with operation levers being operated, FIG. 5 is a sectional view of the apparatus with an original plate sheet being set, FIG. 6 is a sectional view of the apparatus with the original plate sheet and the holder being set, FIG. 7 is a sectional view for explaining a method of replacing an original plate with a new one in the state shown in FIG. 6, FIG. 8 is a block diagram showing a circuit arrangement of the apparatus, FIGS. 9, 10 and 11 are enlarged sectional views each showing a main part of the apparatus in a state wherein an original plate is formed by transfer, FIGS. 12, 13, 14 and 15 are enlarged sectional views each showing a main part of the apparatus in a state wherein an image is thermally transferred onto a recording medium by using the formed original plate, FIG. 16 is a perspective view showing an outer appearance of a state wherein an ink image is formed on an original plate sheet by using a pen, FIGS. 17 and 18 are enlarged sectional views each showing a main part of the apparatus in a state wherein an image is thermally transferred onto a recording medium by using the formed original plate, FIG. 19 is an enlarged sectional view showing a main part of the apparatus in a state wherein an image is transferred onto a flower vase in place of the recording medium, and FIG. 20 is an enlarged sectional view showing a main part of the apparatus in a state wherein images are formed on the upper and lower surfaces of an original plate sheet;

FIGS. 21, 22, 23, 24 and 25 are views showing a second embodiment of the present invention, in which FIG. 21 is a perspective view showing an outer appearance of an overall flash transfer apparatus, FIG. 22 is a perspective view showing a fixing jig, FIG. 23 is a perspective view showing a state wherein a pen image is formed on an original plate sheet by using a pen, FIG. 24 is an enlarged sectional view of the apparatus in a state wherein an image is thermally transferred onto a transfer medium, and FIG. 25 is a perspective view showing an outer appearance of the transfer medium on which the image is transferred; and FIGS. 26 to 30 are views respectively showing modifications of the respective components, in which FIG. 26 is a perspective view showing an outer appearance of a modification of an original plate sheet hold structure, FIG. 27 is a perspective view showing an outer appearance of a member for reinforcing an original plate sheet, FIG. 28 is an enlarged sectional view showing a modification of an ink sheet, FIG. 29 is a perspective view showing an outer appearance of a reinforcing sheet having a reflecting layer, and FIG. 30 is an enlarged perspective view for explaining the structure in FIG. 29.

DETAILED DESCRIPTION OF THE PREFERRED EMBODIMENTS

First Embodiment

A first embodiment of the present invention will be described below with reference to FIGS. 1 to 20.

Figure 1:
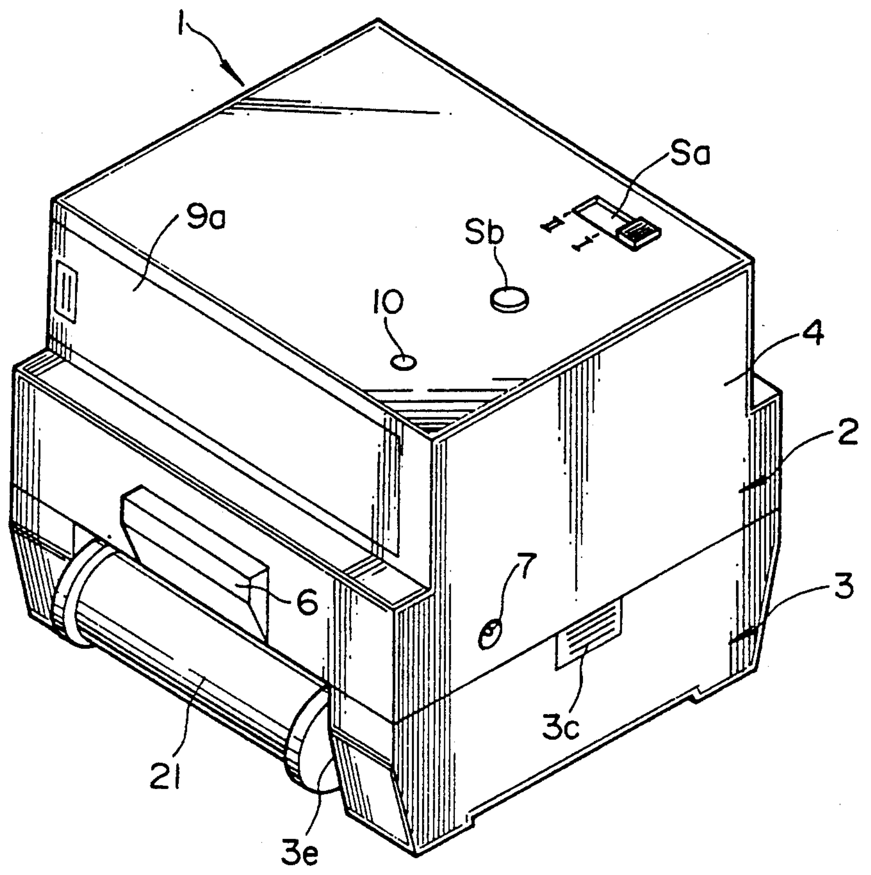
Figure 2:
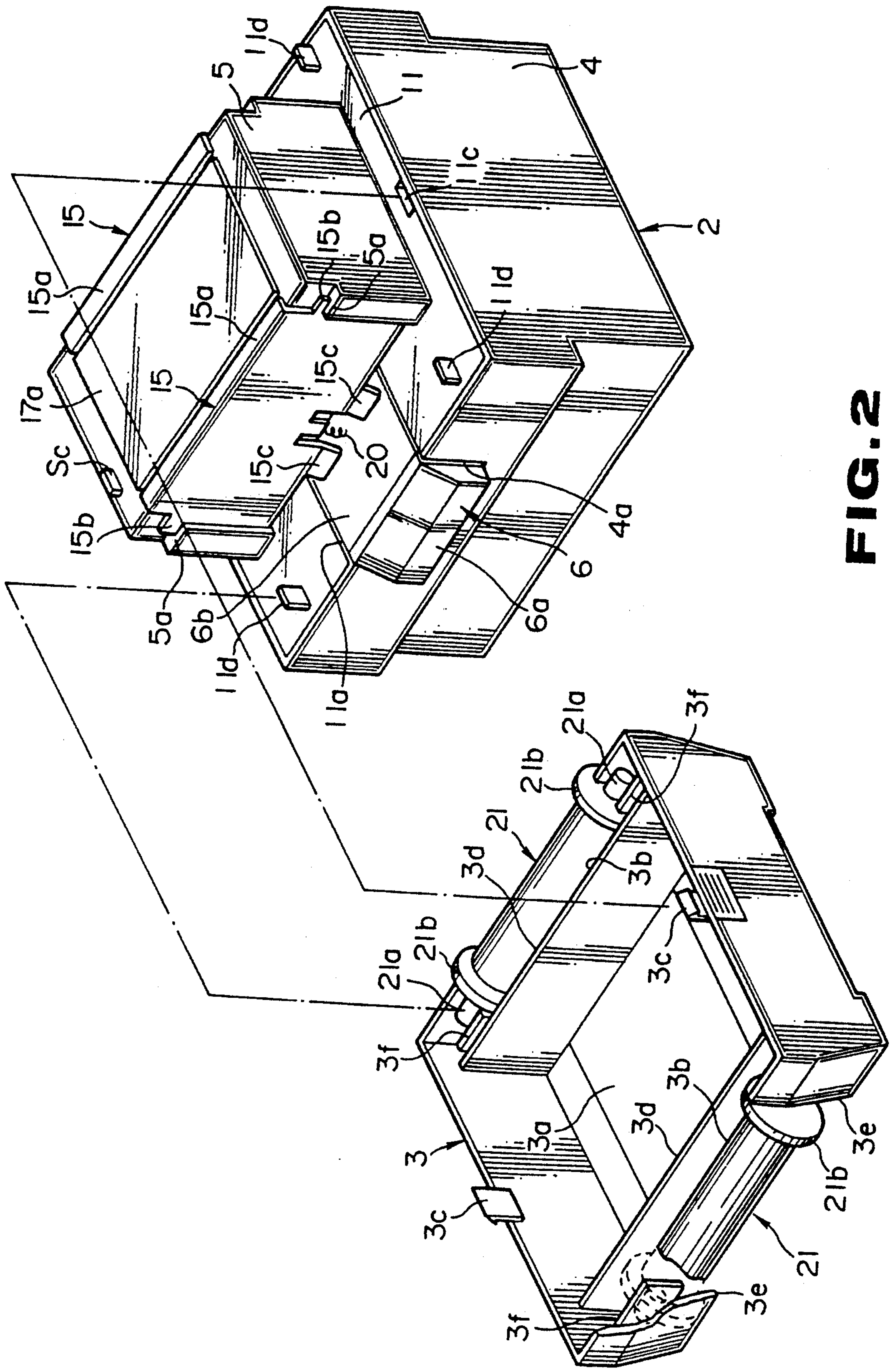
Figure 3:
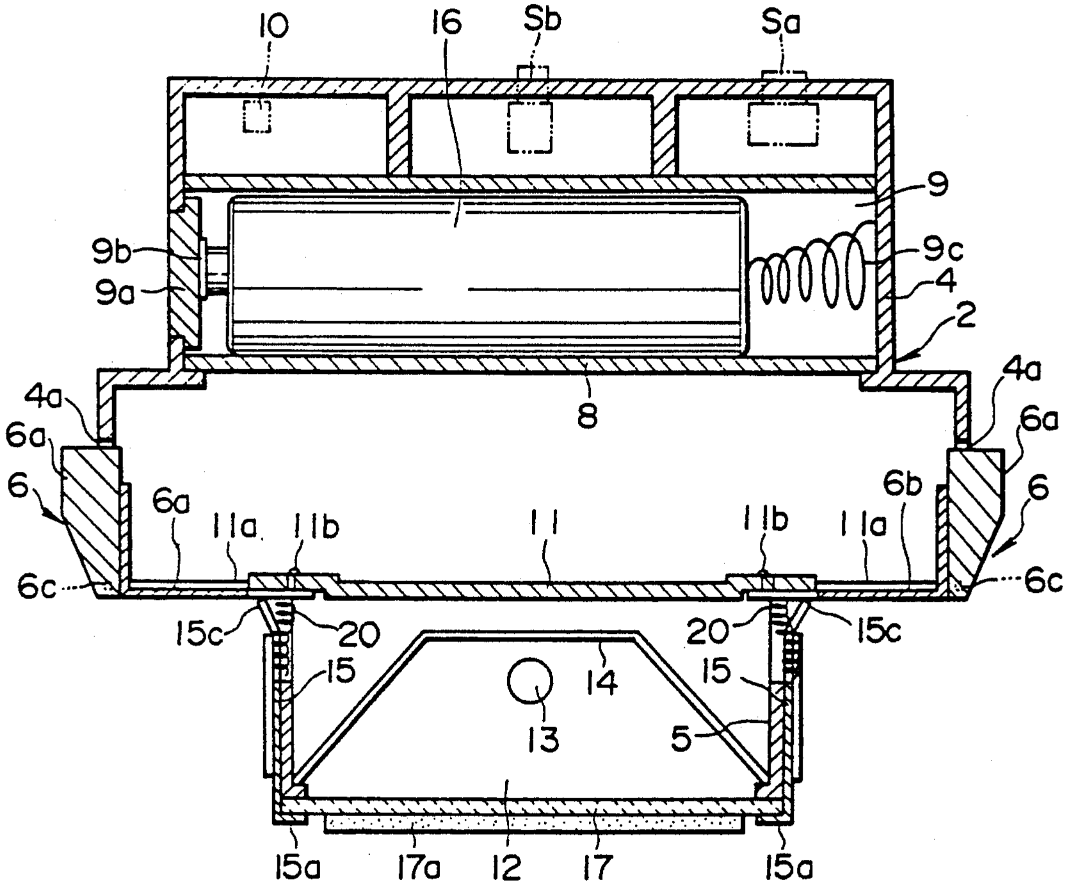

FIGS. 1 to 8 show a flash thermal transfer apparatus for practicing a flash thermal transfer method of the present invention. A flash thermal transfer apparatus 1 is designed such that an ink holder 3 is detachably mounted on the lower portion of a main body 2, as shown in FIG. 2. As shown in FIGS. 1 and 2, the main body 2 is formed into a three-stage box. A two-stage upper case 4 on the upper side (the lower side in FIG. 2) and a lower case 5 constituting a step on the lower side (the upper side in FIG. 2) of the main body 2 are integrally fastened to each other by screws (not shown). The holder 3 is attached to the main body 2 so as to cover the lower case 5. The upper case 4 is constituted by a hollow box-like member having a small thickness. As shown in FIG. 1, operation levers 6 are arranged on both the sides of an intermediate stage portion of the case 4, and a connecting portion 7 for an AC/DC conversion adapter is arranged on the front side surface of the case 4. An upper stage portion of the upper case 4 has a box-like shape smaller in width than the intermediate stage portion at two opposite sides. As shown in FIG. 3, the inside of the upper stage portion is partitioned by an upper partition plate 8 arranged on an upper portion of the intermediate stage portion. A battery storage chamber 9 is formed by the plate 8. A power source switch Sa, a flash switch Sb, and a light-emitting diode 10 are arranged on the upper surface of the upper stage portion. The lower case 5 has a box-like shape smaller in size than the intermediate stage portion. As shown in FIG. 3, the inside of the lower case 5 is partitioned by a lower partition plate 11 arranged on a lower portion of the intermediate stage portion, thus forming a light source chamber 12. A flash lamp 13 and a reflecting plate 14 are arranged in the light source chamber 12. Hold members 15 are arranged on both the side surfaces of the lower case 5 so as to be vertically slidable.

The respective components will be sequentially described below.

The battery storage chamber 9 stores a battery 16. A battery lid 9*a* is arranged on the left side surface of the upper stage portion of the upper case 4. An electrode plate 9*b* is formed on the battery lid 9*a*, and an electrode spring 9*c* is formed on the deep side (right side). The power source switch Sa is constituted by a slide switch. The switch Sa is used to turn on the power source and is switched to a plurality of stages (two stages, i.e., positions I and II in this embodiment) to adjust the flash energy of the flash lamp 13. The flash switch Sb is constituted by a push button switch. The switch Sb is operated upon completion of charging to flash the flash lamp 13. The light-emitting diode 10 is turned on upon completion of charging to signal that the flash lamp 13 can be flashed.

The light source chamber 12 is a space formed in the lower case 5. The lower portion of the chamber 12 is open, and a transparent member 17 formed of glass or an acrylic resin covers the opening (a transparent window portion). The flash lamp 13 is constituted by a xenon lamp or the like used for a stroboscope and is turned on by the operation of the above-described flash switch Sb. The intensity of a flash varies depending on the set state of the power source switch Sa. The reflecting plate 14 is disposed above the flash lamp 13 to reflect light from the lamp 13 downward to the transparent member 17. A cushion member 17*a* is bonded to the lower surface of the transparent member 17 by a transparent adhesive. The cushion member 17*a* consists of a foamed material having elasticity, such as a foamed urethane or foamed polyester material, which appears whitish, but is light-transmissive. In this case, a "light-transmissive" member is not limited to a transparent member which allows light to completely pass therethrough, but is used in a broad sense. Therefore, a translucent member or a member which allows the inside to be seen therethrough may be used as the cushion member 17*a*. The cushion member 17*a* has a size slightly smaller than that of the transparent member 17 and has a relatively large thickness.

A safety switch Sc is arranged on the lower case 5, as shown in FIG. 2. The safety switch Sc comprises an operation element which can reciprocally extend downward (upward in FIG. 2) in the light source chamber 12. When the main body 2 is mounted on an original 22 or a recording sheet 23 (to be described later) with the light source chamber 12 being located at a lower position, the operation element is pushed to turn on the safety switch Sc.

The operation levers 6 are formed on both the side surfaces of the intermediate stage portion so as to extend to its lower surface, and are respectively used to vertically move the hold members 15 (hold means). Each lever 6 has an operation button 6*a* and a pivot arm 6*b* and is pivotally attached to the upper case 4 by a pin 6*c*. More specifically, the operation buttons 6*a* are arranged in button insertion holes 4*a* formed in both the side surfaces of the upper case 4. The lower portion of each operation button 6*a* is pivotally mounted on the upper case 4 by the pin 6*c* so as to reciprocally extend inward and outward from the upper case 4. Part of the operation button 6*a* normally extends outward from the case 4. Each pivot arm 6*b* is formed of an L-shaped member and is arranged in a notched portion 11*a* formed in the lower partition plate 11 in the upper case 4 in correspondence with the button insertion hole 4*a*. The distal end of the pivot arm 6*b* is bifurcated and extends to the lower surface of the lower partition plate 11 to be brought into contact therewith. With this arrangement, when the operation button 6*a* is pushed from the outside, the pivot arm 6*b* is pivoted on the pin 6*c* in a direction indicated by an arrow X in FIG. 4, and the distal end of the operation lever 6 moves downward.

Figure 4:
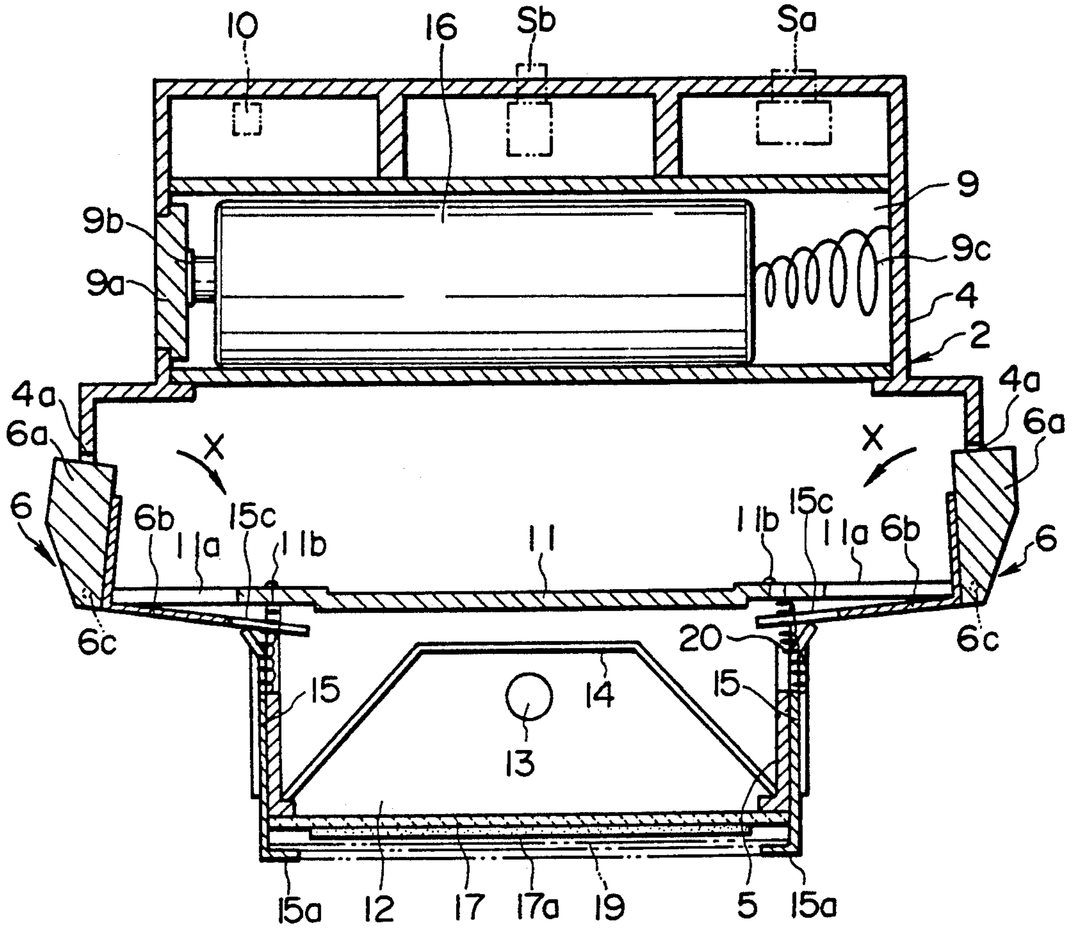

The hold members 15 are vertically moved upon operation of the operation levers 6. When the hold members 15 are pushed downward by the levers 6, the lower ends of the members 15 are moved away from the cushion member 17*a* so as to allow an original plate sheet 19 (to be described later) to be set, as shown in FIG. 4.

Figure 5:
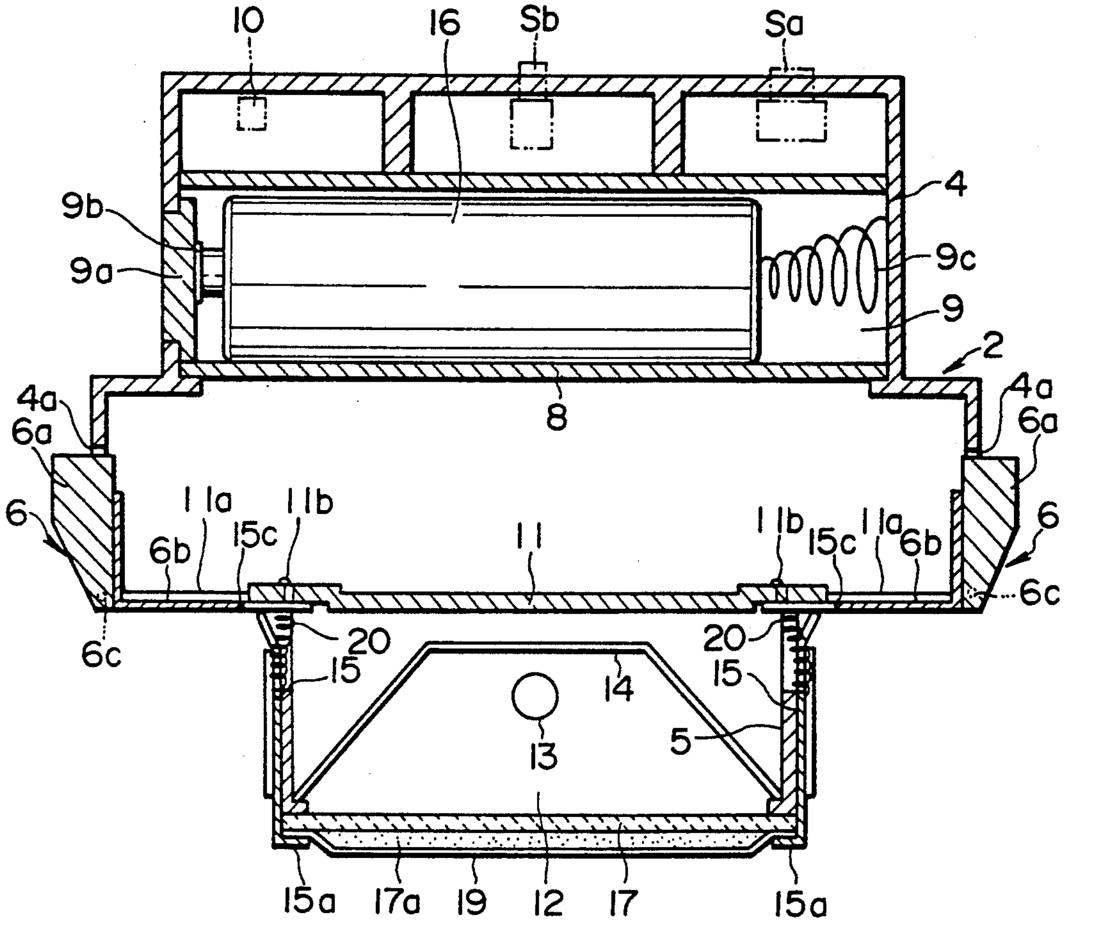

When the hold members 15 are pulled upward, the members 15 tightly hold the original plate sheet 19 on the lower surface of the cushion member 17*a* mounted on the lower surface of the transparent member 17, as shown in FIG. 5.

Each hold member 15 is flat and is bent in the form of an L shape in a direction that lock portions 15*a* oppose each other at the lower ends of the members 15. As shown in FIG. 2, guide portions 16*b* are formed on both sides of each hold member 15, and abutment portions 15*c* are formed on the upper end (lower end in FIG. 2) of each hold member 15. These components are normally pulled together upward (downward in FIG. 2) by a coil spring 20. In this case, the lock portions 15*a* at the lower end directly bias peripheral edges of the original plate sheet 19 toward edges of the transparent member 17 and elastically press the original plate sheet 19 toward the lower surface side of the transparent member 17 through the cushion member 17*a*, as shown in FIG. 5. The guide portions 16*b* at both the sides of each hold member 15 are respectively arranged in guide grooves 5*a* formed in both the sides of the side surfaces of the lower case 5 so as to be vertically movable. Each abutment portion 15*c* on the upper end of the hold member 15 is slightly bent outward and hence is tilted. The upper end of each abutment portion 15*c* is always in contact with the pivot arm 6*b* of the operation lever 6 thereabove.

The lower end of each coil spring 20 is mounted on the upper end of the hold member 15 between the abutment portions 15*c*. The upper end of each coil spring 20 is hooked in a corresponding mount hole 11*b* of the lower partition plate 11 while disposed between the bifurcated ends of each pivot arm 6*b* of each operation lever 6 located below the plate 11. With this arrangement, the hold members 15 are always pulled upward.

Figure 6:
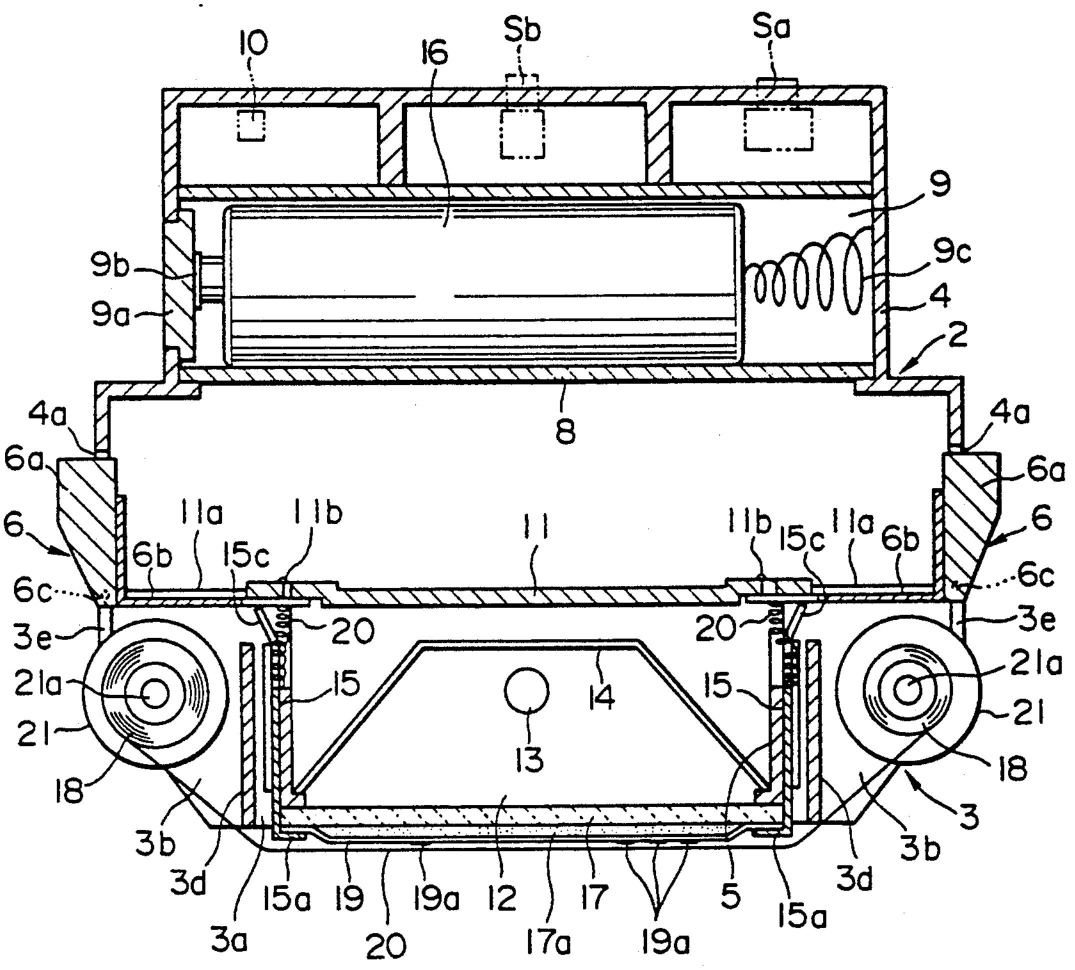
Figure 7:
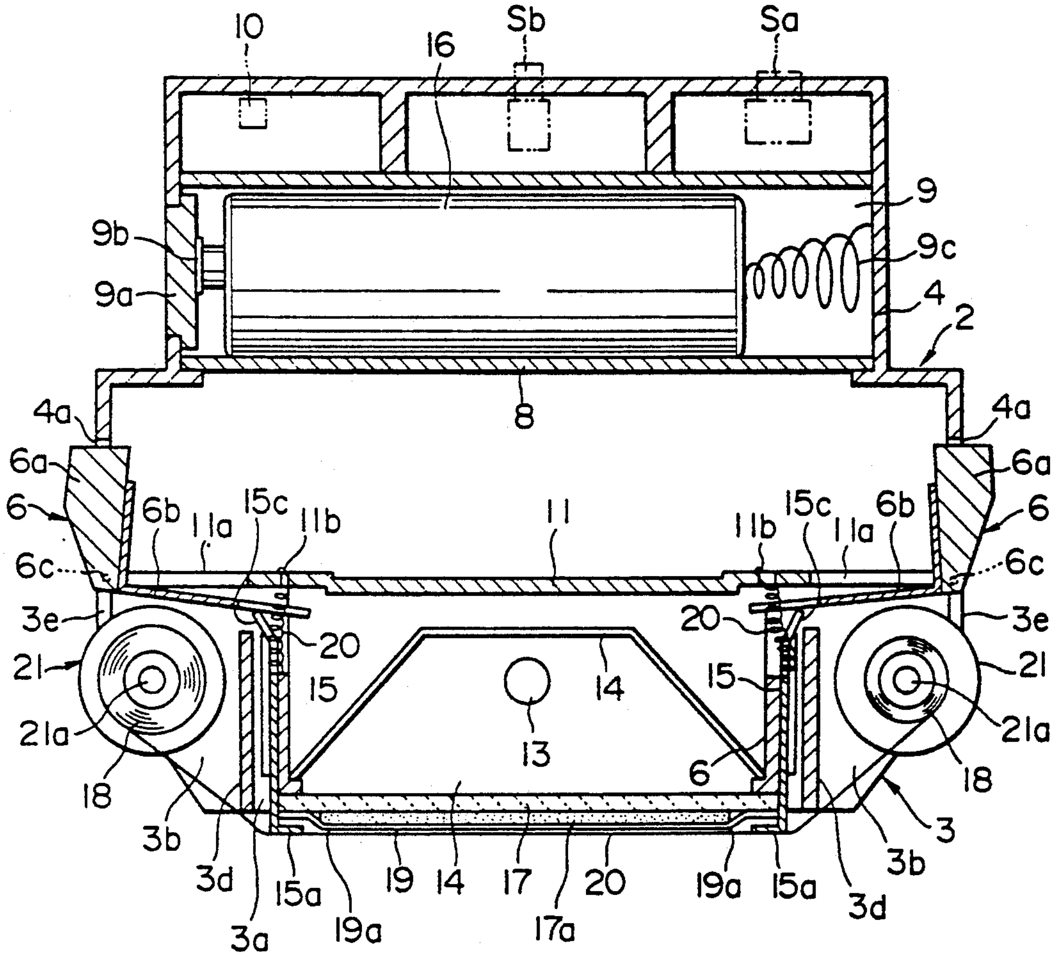

The ink holder 3 is used to attach an ink sheet 18 (in FIG. 6) to the main body 2. The ink holder 3 is detachably mounted to the lower portion of the main body 2 so as to cover the lower case 5. More specifically, as shown in FIG. 2, the ink holder 3 has a rectangular box-like shape whose upper side is open and has an opening formed in its lower portion in correspondence with the transparent member 17 of the light source chamber 12. Reel storage portions 3*b* are formed on both the sides of the opening 3*a*, and hook portions 3*c* are formed on the upper portions of the front and rear walls of the ink holder 3 so as to extend upward. With this arrangement, when the hook portions 3*c* are detachably engaged with lock recess portions 11*c* (one of which is not shown in FIG. 2) formed in the lower surface, i.e., the lower partition plate 11 on the intermediate stage portion, the ink holder 3 is attached to the lower portion of the main body 2. In this case, the opening 3*a* of the bottom portion is formed to be larger than the transparent member 17 of the light source chamber 12. As shown in FIGS. 6 and 7, therefore, when the ink holder 3 is attached to the main body 2, the lock portions 15*a* formed on the lower ends of the hold members 15 and the cushion member 17*a* respectively extend downward through the opening 3*a*. The reel storage portions 3*b* on both the sides of the ink holder 3 respectively store reels 21 so as to allow them to rotate. The portions 3*b* are respectively partitioned by partition walls 3*d* from the middle portion of the ink holder 3. The outer wall of each portion 3*b* is inclined inward, and an opening 3*e* is formed on the inclined portion of the outer wall to expose part of the reel 21 to the outside. Shaft support portions 3*f* for supporting shaft portions 21*a* of each reel 21 are respectively formed on the front and rear portions of the inside of each reel storage portion 3*b*. In this case, the partition walls 3*d* are designed not to interfere with the vertical movement of the hold members 15 and the operation levers 6 when the ink holder 3 is attached to the lower portion of the main body 2. In addition, the shaft support portions 3*f* support the shaft portions 21*a* with a certain frictional resistance to prevent the reel 21 from freely rotating. When the ink holder 3 is attached to the lower portion of the main body 2, the shaft portions 21*a* are pressed by restriction projections 11*d* extending from the lower partition plate 11 of the upper case 4. The ink sheet 18 is wound around the reels 21 so as to extend from one of the reel storage portions 3*b* to the other through the lower side of the opening 3*a*. When a reel portion 17*b* exposed from each reel storage portion 3*b* is rotated by a finger or the like against the frictional resistance, the ink sheet 18 is taken up by one of the reels 21. Since the reels 21 are respectively supported by the shaft support portions 3*f* with the frictional resistance, the ink sheet 18 wound around the reels 21 is stretched over the lower surface of the transparent member 17 of the light source chamber 12 without being slackened.

The original plate sheet 19 mounted on the lower surface side of the transparent member 17 of the light source chamber 12 through the cushion member 17*a* is constituted by a transparent thermoplastic resin made of polyester, polypropylene, or the like. One surface (upper surface in FIG. 11) of the sheet 19 is roughened by, e.g., honing, thereby frosting sheet 19, like a frosted glass. However, the sheet 19 is light-20 transmissive. The upper layer portion of an original image 22*a* of the original 22 (to be described later) is transferred onto the toughened surface 19*a* of the original plate sheet 19. In addition, an original plate image 19*b* can be formed on the surface 19*a* by using a pen 31, as will be described later. The original plate image 19*b* of the sheet 19 is formed by, e.g., thermal transfer of a record printed by a thermal printer, electrostatic copying by a carbon toner, transfer from a lettering sheet, or manual writing using a pencil, a ballpoint pen or a pen using an ink. That is, the original plate image 19*b* includes a carbon powder and a binder for binding the carbon powder. In consideration of the low heat absorption coefficient of the original plate image 19*b*, the original plate sheet 19 preferably has a thickness of about 10 to 80 μm. If the original plate sheet 19 having such a thickness is hard to mount the sheet 19 may be bonded to a frame-like support member (not shown) to be mounted.

Figure 13:
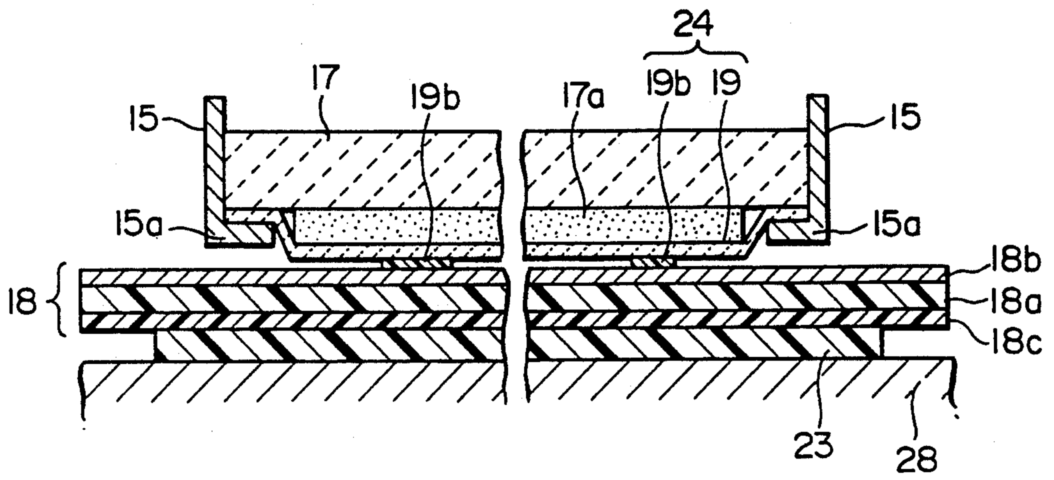

The ink sheet 18 wound around the reels 21 of the ink holder 3 is used to transfer an image corresponding to the original plate image 19*b* transferred onto the original plate sheet 19 onto the recording sheet 23 such as plain paper. As shown in FIG. 13, the ink sheet 18 is designed such that a reflecting layer 18*b* constituted by a metal deposition layer consisting of nickel (Ni), aluminum (Al), copper (Cu), or the like is formed on the upper surface of a transparent or opaque base film 18*a* having a thickness of about 5 to 50 μm and consisting of polyester or the like, and a hot-melt ink layer 18*c* consisting of a color ink or the like is formed on the lower surface of the base film 19*a*. As this color ink, various color inks other than a black ink, such as red, yellow, green, gold, and silver inks can be employed.

Figure 8:
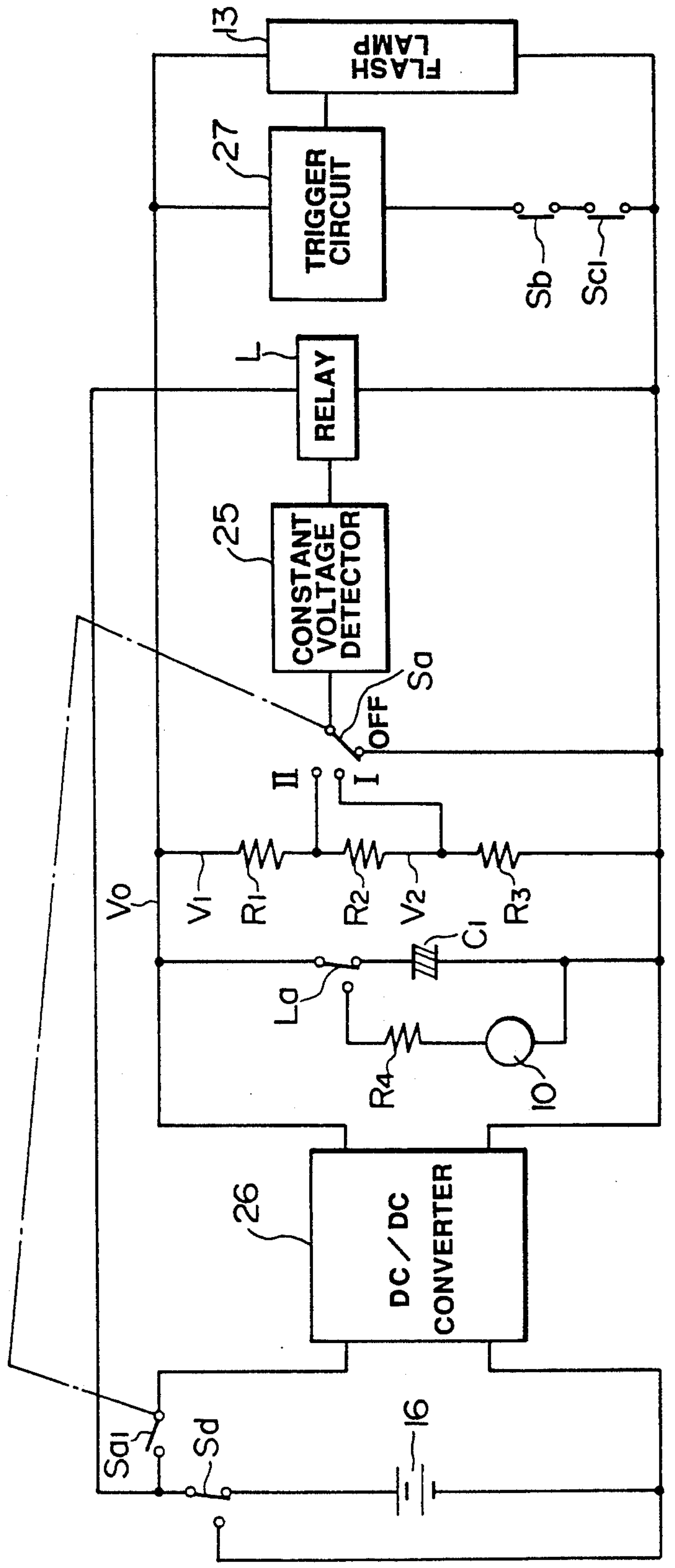

FIG. 8 shows a circuit arrangement of the flash thermal transfer apparatus 1 described above. Referring to FIG. 8, reference symbol Sd denotes a power source switch which is normally closed. Upon insertion of the connection portion 7 for an AC/DC conversion adapter, the switch Sd disconnects the line of the battery 16 and is set to the external power source side. The battery 16 is stored in the battery storage chamber 9 of the main body 2 and is connected to a relay L. In addition, the battery 16 is connected to a DC-DC converter 26, a discharge capacitor C1, a trigger circuit 27, and the flash lamp 13 through a contact Sa1 which is operated in response to the power source switch Sa interposed between voltage-dividing resistors R1, R2, and R3 and a constant voltage detector 25. The DC-DC converter 26 converts the voltage of the battery 16 to a high voltage, and applies the converted voltage to the flash lamp 13. The power source switch Sa is interlocked with the contact Sa1. When the switch Sa is at an OFF position, the contact Sa1 is opened. When the switch Sa is at position I or II, the contact Sa1 is closed. The voltage-dividing resistors R1, R2, and R3 divide a charged voltage V0 into voltages V1 and V2. In this case, $V0>V1>V2$. The constant voltage detector 25 is constituted by, e.g., a Zener diode, a transistor, and the like. When a voltage exceeding a predetermined voltage is applied to the cathode of the Zener diode connected to the input side, the transistor is operated. In this case, the detector 25 is operated at a slower timing when the switch Sa is at the position I than when the switch Sa is at the position II. In other words, the charge time of the discharge capacitor C1 is longer and the capacitor C1 is charged to a higher voltage when the switch Sa is set at the position I than when the switch Sa is set at the position II. For this reason, if the flash switch Sb is closed when the switch Sa is at the position I, the flash lamp 13 emits weaker light than when the switch Sa is at the position II. When the contact Sa1 is closed to charge the capacitor C1, and a current flows in the transistor of the above-described constant voltage detector 25, the relay L opens a contact La and turns on the light-emitting diode 10 through a resistor R4. The trigger circuit 27 includes a boosting transformer. When the switch Sb is closed while a contact Sc1 of a safety switch Sc is closed, the trigger circuit 27 boosts a voltage charged in the capacitor C1 and flashes the flash lamp 13.

A method of forming an original plate sheet 19, with the image 22*a* transferred from the original, by using the flash thermal transfer apparatus 1 having the above-described arrangement will be described below with reference to FIGS. 9 to 12.

In this case, the original 22 is prepared first. The original 22 is prepared in such a manner that the original image 22*a* is formed on a recording sheet 22*b* such as usual plain paper. Any image containing carbon may be used as the original image 22*a*. For example, a record having a printed image by a thermal printing head, a copy having an ink image electrostatically formed using a carbon toner, a printed matter such as a newspaper and a magazine, a lettering sheet, and a record (to be described later) written with a pen 31 such as a pencil, a ballpoint pen, or a carbon ink may be used as the original 22. Of the above items, when a lettering sheet is to be used, an ink image such as characters or a graphic image is printed on the lower surface of a transparent sheet through a release agent to prepare a lettering sheet. The surface of the lettering sheet, on which the ink image is formed, is brought into tight contact with the recording sheet 22*b*. The ink image is then transferred onto the recording sheet 22*b* by tracing the ink image on the upper surface of the transparent sheet with a relatively hard member having a pointed end, such as a pen or a bar, thus forming the original 22.

Figure 9:
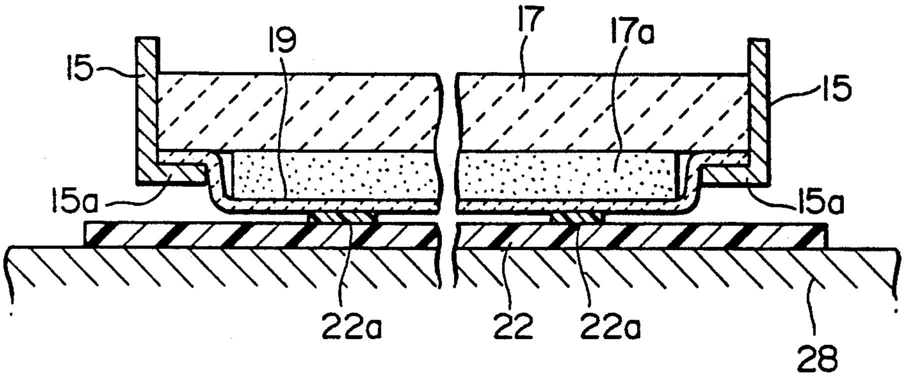
Figure 10:
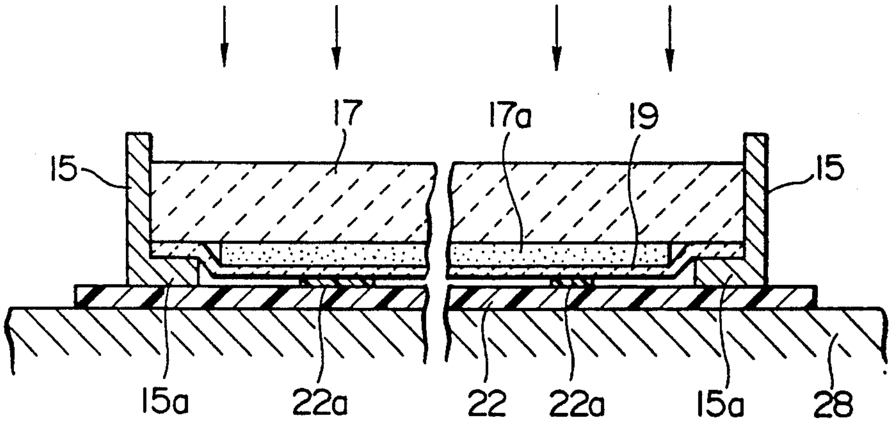

When an original plate 24 is to be formed by using the original thus formed, the holder 3 is detached from the lower portion of the main body 2, as shown in FIGS. 2 and 3. In this state, the operation levers 6 are operated to push the hold members 15 downward, as shown in FIG. 4, and the original plate sheet 19 is set at the lower surface side of the transparent member 17 formed at the lower portion of the light source chamber 12. More specifically, when the operation button 6a of each operation lever 6 is pushed from the outside, the pivot arm 6b pivots on the pin 6c in a direction indicated by an arrow X, and the distal end of the pivot arm 6b pushes the abutment portions 15c of the hold member 15 downward against the force of the coil spring 20. The guide portions 16b on both the sides of the hold member 15 are respectively guided by the guide grooves 5a of the lower case 5 and are moved downward. The lock portion 15a formed on the lower end of the hold member 15 is pushed downward from the cushion member 17a formed on the lower portion of the transparent member 17. In this state, the original plate sheet 19 is inserted between the lock portions 15a of the hold members 15 and the cushion member 17a while the surface on which the fine pattern 19a is formed faces up. When the pressures acting on the operation levers 6 are released, the hold members 15 are pulled upward by the coil springs 20. As a result, the lock portions 15a at the lower ends of the hold members 15 push peripheral edges of the original plate sheet 19 through the cushion member 17a so that its edges are directly urged against edges of the transparent member 17, as shown in FIG. 5. With this operation, as shown in FIG. 9, the entire surface of the original plate sheet 19 is brought into tight contact with the lower surface of the transparent member 17 because of the elastic force of the cushion member 17a. Since the cushion member 17a has a size narrower than the distance between the lock portions 15a, the lock portions 15a hold the original plate sheet 19 by directly urging its edges against the edges of the transparent member 17, and at the same time, are recessed from the lower surface of the sheet 19. After the original plate sheet 19 is attached in this manner, the main body 2 is placed on the original 22 with the original plate sheet 19 being placed at the bottom of the main body 2, as shown in FIG. 9. In this case, the original 22 is placed on a flat mount base, e.g., on a table. In this state, if the main body 2 is depressed by a hand, the cushion member 17a is compressed, and the lower surface of the original plate sheet 19, i.e., the other surface on which the fine pattern 19a is not formed, uniformly adheres to the entire image surface of the original 22, as shown in FIG. 10. In this case, the main body 2 is pushed to compress the cushion member 17a until the lock portions 15a, which are recessed from the lower surface of the original plate sheet 19, are brought into contact with the original 22, thereby causing the original plate sheet 19 to uniformly adhere to the original 22. When the original plate sheet 19 is brought into tight contact with the original 22 in this manner, the safety switch Sc is operated to close the contact Sc1. As a result, a state wherein copying of the original 22 can be performed is obtained.

The power source switch Sa formed on the upper surface of the main body 2 is set in an ON state (either the position I or II) to adjust a flash amount. The contact Sa is then closed, as shown in FIG. 8. Charging of the discharge capacitor C1 is started. With the progress of charging of the capacitor C1, the voltage V0 is increased. When the voltage V1 at the input side of the constant voltage detector 25 reaches a predetermined value, the contact La of the relay L is opened to stop charging the discharge capacitor C1. At the same time, the light-emitting diode 10 is turned on. This informs an operator that a flash operation is ready. When the flash switch Sb is closed in this state, the voltage charged in the capacitor C1 is applied to the trigger circuit 27, and a high voltage is applied to the trigger electrode of the flash lamp 13. As a result, the flash lamp 13 emits a strong flash of light.

Figure 11:
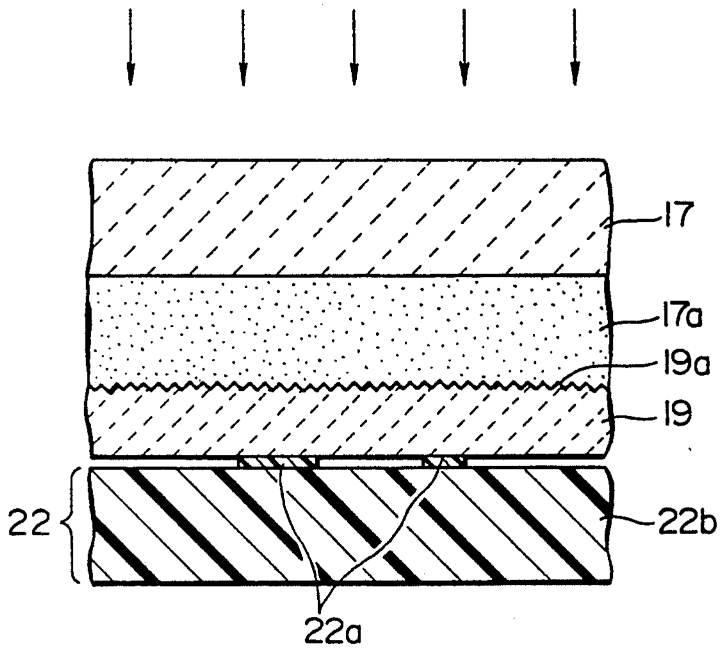
Figure 12:
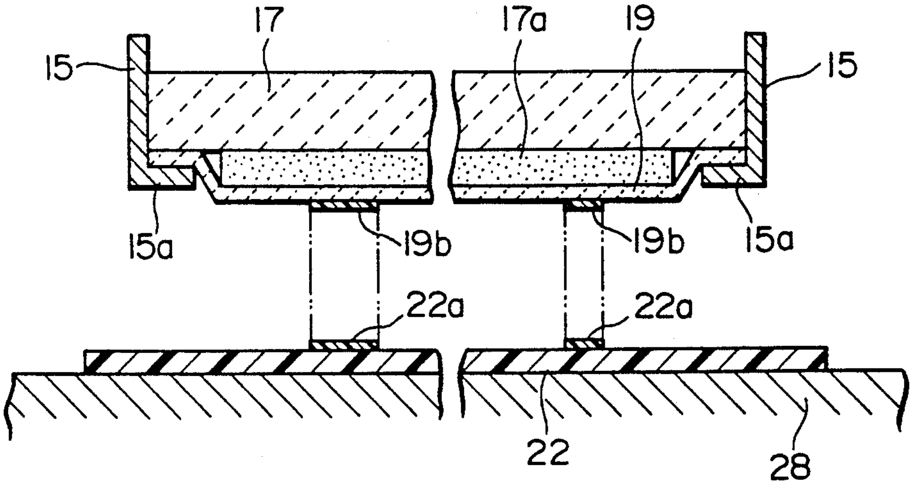

When the flash lamp 13 flashes in this manner, the light is radiated on the original 22 through the transparent member 17 formed at the lower portion of the light source chamber 12 and the original plate sheet 19, as shown in FIGS. 10 and 11. Since the original 22 is caused to elastically adhere to the lower surface of the original plate sheet 19 by the cushion member 17a, the upper layer portion of the original image 22a formed on the original 22 is transferred onto the lower surface of the original plate sheet 19, i.e., the other surface on which the fine pattern 19a is not formed, as the original plate image 19b, as shown in FIG. 12. The upper layer portion of the original image 22a is transferred due to the effect that carbon powders contained in the original image 22a absorbs infrared rays radiated from the flash lamp 13 to be heated, and a binder for binding the carbon powders is melted due to the heat of the powder to be bonded to the lower surface of the original plate sheet 19. In this case, the original plate sheet 19 is softened by the heat of the carbon powder. This contributes to the thermal transfer. As a result, the original image 22a of the original 22 is faithfully and clearly transferred onto the original sheet 19, and a copy of the original 22 can be obtained. Moreover, this copy can be also used as the original plate 24.

A method of transferring the original plate image 19b, which has been formed on the original plate sheet 19 in this manner, onto the recording sheet 23 will be described below with reference to FIGS. 13 to 15.

In this case, the reels 21 around which the ink sheet 18 is wound are respectively stored in the reel storage portions 3b of the ink holder 3, and the ink holder 3 is attached to the lower portion of the main body 2. More specifically, the end portions of the ink sheet 18 are respectively wound around the reels 21, and the intermediate portion of the ink sheet 18 is placed below the holder 3, as shown in FIG. 6. The reels 21 are then inserted in the reel storage portions 3b from the above through both the sides of the holder 3. The shaft portions 21a of each reel 21 are rotatably supported by the shaft support portions 3f, respectively. In this state, the ink holder 3 is placed to oppose the lower portion of the main body 2, and the hook portions 3c respectively formed on the front and rear portions of the ink holder 3 are engaged with the lock recess portions 11c of the main body 2. With this operation, the ink holder 3 is attached to the lower portion of the main body 2. When the ink holder 3 is attached in this manner, the original plate 24 held at the lower side of the transparent member 17 of the light source chamber 12 extends downward from through the opening 3a of the ink holder 3, and the ink sheet 18 is stretched over the lower surface of the original plate 24, as shown in FIG. 6. The main body 2 on which the ink sheet 18 is stretched is arranged on the recording sheet 23 on the mount base 28, as shown in FIG. 13. When the main body 2 is depressed by hand in this state to the recording sheet 23 on the mount base 28, as shown in FIG. 14, the cushion member 17a is compressed, and hence the original plate 24 is caused to elastically adhere to the upper surface of the ink sheet 18. At the same time, the ink sheet 18 is brought into tight contact with the recording sheet 23.

Note that the safety switch Sc is also operated to close the contact Sc1 in this case. With this operation, the apparatus is set in a ready state to transfer the image onto the recording sheet 23.

When transfer of the image onto the recording sheet 23 is to be performed in this state, similar to the above-described operation of forming the original 10 plate, the 'power source switch Sa is set in an ON state (either the position I or II) to adjust a flash amount. With this operation, charging of the discharge capacitor C1 is started. Upon completion of charging of the capacitor C1, the light-emitting diode 10 is turned on to flash.

Figure 14:
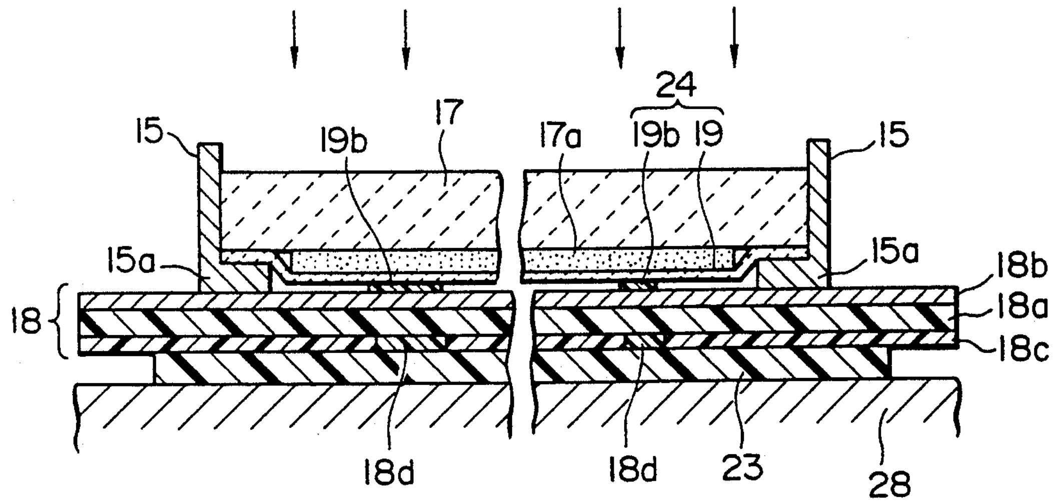
Figure 15:
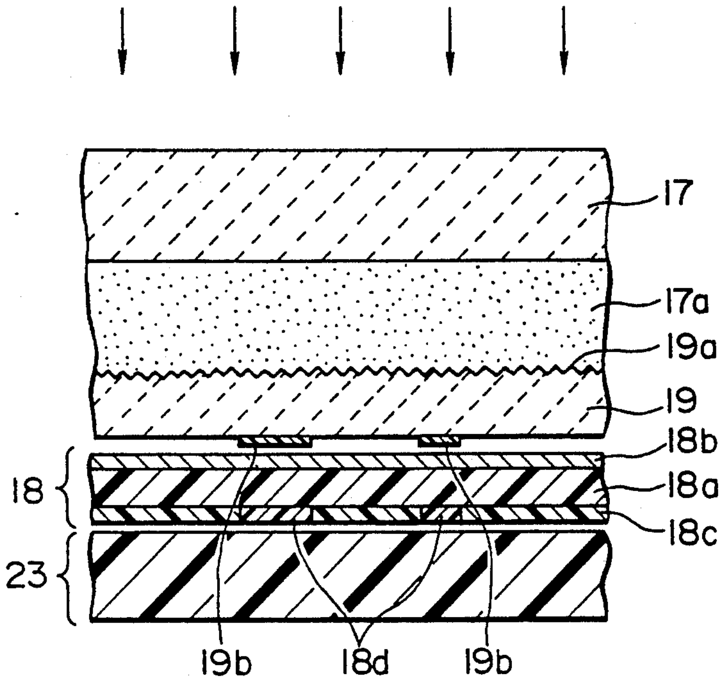

When the flash lamp 13 flashes in this manner, the light is radiated on the ink sheet 18 through the original plate 23, as shown in FIGS. 14 and 15. Since the original plate image **19*b* as part of the original image 22*a* of the original 22 is formed on the lower surface of the original plate 24, and the original plate image 19*b* contains a carbon powder having excellent heat absorbability, the original plate image 19*b* absorbs the infrared rays radiated from the flash lamp 13 to generate heat. Light transmitted through portions other than the original plate image 19*b* of the original plate 24 is reflected by the reflecting layer 18*b* of the ink sheet 18. For this reason, these portions of the ink sheet 18 are not heated. The heat accumulated in the original plate image 19*b* of the original plate 24 is transferred to the hot-melt ink layer 18*c* through the reflecting layer 18*b* and the base film 18*a*, so that the hot-melt ink layer 18*c* corresponding to the original plate image 19*b* is melted. A melt portion 18*d* thus formed is then thermally transferred onto the recording sheet 23 located therebelow. As a result, in accordance with the original plate image 19*b* of the original plate 24, the melt portion 18*d* of the hot-melt ink layer 18*c* is faithfully and clearly transferred onto the recording sheet 23 as a copy image in color corresponding to the ink layer 18*c*. When the image is to be transferred onto another recording sheet 23 again, one of the reels 21 exposed from the ink holder 3 is rotated by fingers or the like to extract a new ink sheet 18 under the original plate 24 by a length required for one transfer process, and the flash lamp 13 is flashed in the same manner as described above. By repeating this operation, the image can be transferred onto recording sheets 23 as many times as needed. In addition, the image can be easily transferred onto recording sheets which are bound together like a notebook. If the original plate image 19*b* transferred onto the original sheet 19 is to be transferred onto the recording sheets 23 through a normal ink sheet, since the original plate image is transferred onto the ink sheet little by little, the ink sheet soon become useless after the image is transferred onto only several recording sheets. According to the present invention, however, the ink sheet 18 on the upper surface of which the reflecting layer 18*b* constituted by a metal deposition layer is formed is used, and the original plate image 19*b* of the original plate 19 is in contact with the reflecting layer 18*b*. Therefore, no image is transferred onto the reflecting layer 18*b***, and image transfer can be made on a large number of recording sheets.

In addition to the above-described original plate formed by transferring the image of an original, an original plate formed by directly drawing an image on the original plate sheet 19 with a pen may be used. A transfer method using this method will be described below with reference to FIGS. 16 to 18.

Figure 16:
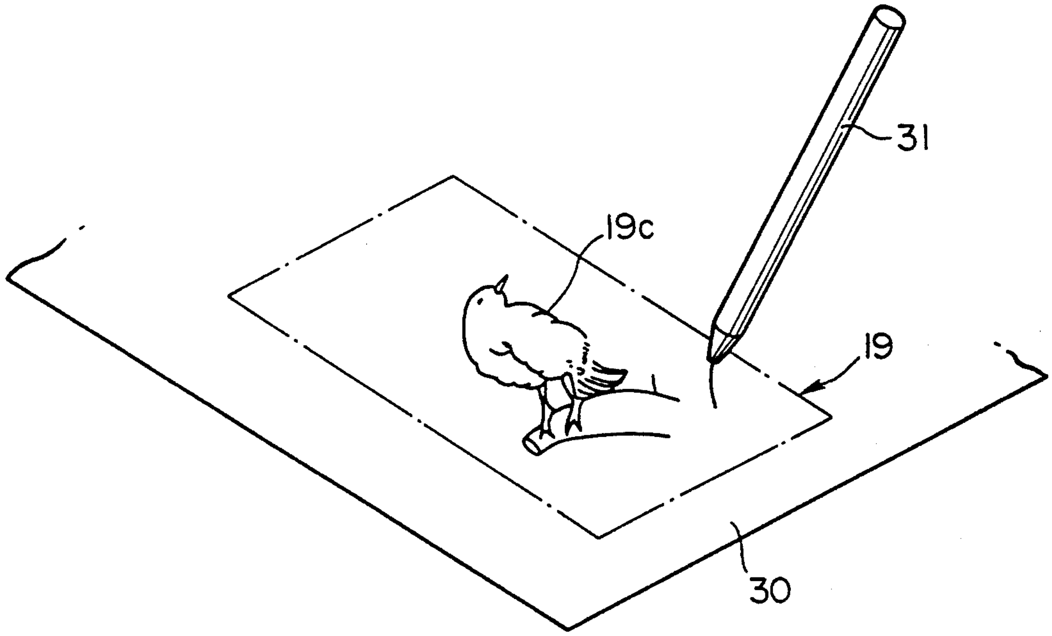
Figure 17:
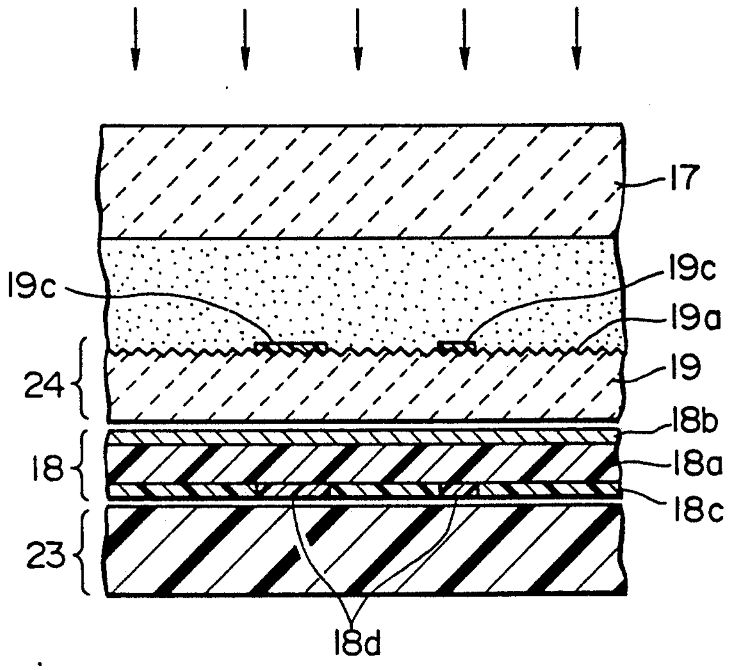

In this flash transfer method, a pen image **19*c* is formed on roughened surface 19*a* of an original plate roll sheet 30 by using a pen 31 such as a pencil. The original plate roll sheet 30 on which the pen image 19*c* is formed is cut in a predetermined size to form the original plate sheet 19. The pen image 19*c* is transferred onto the recording sheet by using this original plate sheet 19. More specifically, as described above, the original plate roll sheet 30 is designed such that the upper surface 19*a* of a transparent resin sheet made of polyester, polypropylene, or the like, is roughened by e.g. honing. The sheet 30 is light-transmissive. As shown in FIG. 16, the pen image 19*c* is formed on the roughened surface (upper surface) 19*a* of the original plate roll sheet 30 by handwriting using the pen 31 such as a ballpoint pen or a pencil having a core containing carbon. In addition to the above process, the pen image 19*c* can be formed by, e.g., thermal transfer upon thermal printing, electrostatic copying, or transfer from a lettering sheet. However, the present invention is characterized in that an original plate is formed by direct drawing using the roughened surface 19*a* of the original plate roll sheet 30. In this case, the pen 31 includes a pencil, a ballpoint pen, and a felt-tip pen. As the pen 31**, a pen having a writing material with excellent heat absorbability, such as carbon, carbon black, or graphite is preferably used.

when image transfer onto the recording sheet 23 is to be performed by using the original plate sheet 19 on which the pen image **19*c* is formed as an original plate, the operation levers 6 are operated in the same manner as described above, and the original plate sheet 19 on which the pen image 19*c* is formed is placed on the lower surface of the cushion member 17*a* while the lock portions 15*a* of the hold members 15 are pushed downward below the cushion member 17*a* formed under the transparent member 17. The original plate sheet 19 is then held on the cushion member 17*a* by the lock portions 15*a* of the hold members 15. In this case, as shown in FIG. 17, an ink image surface of the original plate sheet 19 on which the pen image 19*c* is formed is opposed to the lower surface of the cushion member 17*a*, and comes to tight contact with the lower surface of the cushion member 17*a* by its elasticity force. After the original sheet 19 is attached, the ink holder 3 is mounted on the main body 2, and the ink sheet 18 is stretched over the lower surface of the original plate sheet 19. Thereafter, the main body 2 is arranged on the recording sheet 23 placed on the mount base 28 with the ink sheet 18 being set below, and the main body 2 is pressed against the recording sheet 23. Since the cushion member 17*a* is compressed, the original plate sheet 19 is brought into tight contact with the ink sheet 18, and at the same time, the ink sheet 18 is brought into tight contact with the recording sheet 23, as shown in FIG. 17. With this operation, the apparatus is set in a ready state to transfer the image onto the recording sheet 23**.

Figure 18:
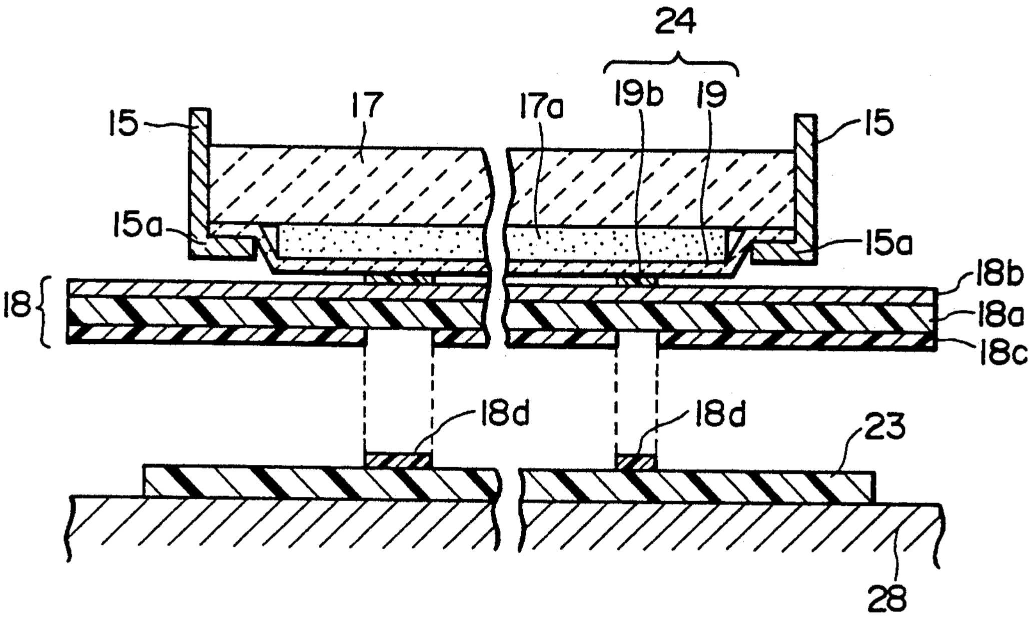

When image transfer onto the recording sheet 23 is to be performed in this state, the power source switch Sa is turned on to cause the flash lamp 13 to flash in the same manner as described above. The infrared rays emitted from the flash lamp 13 are radiated onto the ink sheet 18 through the original plate sheet 19, as shown in FIG. 17. When the infrared rays are radiated on the original plate sheet 19 in this manner, since the pen image **19*c* is formed on one surface of the original plate sheet 19 on which the fine pattern 19*a* is formed, the portion of the pen image 19*c* absorbs the rays to generate heat. This heat is transferred to the hot-melt ink layer 18***c* through the reflecting layer 18*b* and the base film 18*a*, and the hot-melt ink layer 18*c* corresponding to the portion of the pen image 19*c* is melted, thereby thermally transferring the melt portion 18*d* onto the recording sheet 23 located therebelow, as shown in FIG. 18. With this operation, an image corresponding to the pen image 19*c* of the original plate sheet 19 is reliably and clearly transferred onto the recording sheet 23.

In the above-described embodiment, the original plate can be replaced with a new one without detaching the ink holder 3, to which the ink sheet is attached, from the main body 2. More specifically, if the operation levers 6 are operated in the state shown in FIG. 6, the hold members 15 are pushed downward in the same manner as in the case shown in FIG. 4. At this time, the lock portions 15*a*, which are urging the original plate 24 against the cushion member 17*a*, are separated from the original plate 24, and at the same time, raise the ink sheet 18. As a result, the lock portions 15*a* and the ink sheet 18 are separated from the cushion member 17*a* by a relatively large distance, as shown in FIG. 7. Therefore, the original plate 24 which has been attached to the main body 2 can be detached therefrom, and at the same time, another original plate 24 can be inserted therein.

Figure 19:
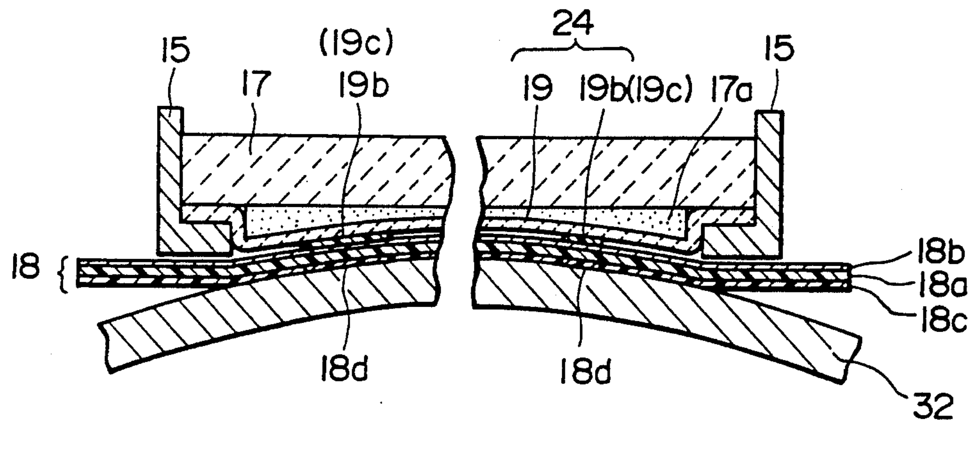

In the above-described flash thermal transfer apparatus 1, the original plate image 19*b* or the pen image 19*c* of the original plate 24 can be transferred onto an object 32 (to which an image is to be transferred) having an arcuated surface, such as a vase, as shown in FIG. 19. In this case, the flash thermal transfer apparatus 1 in which the ink sheet 18 is stretched over the lower surface of the original plate 24 is depressed against the outer surface of the object 32 in a manner similar to the above-described process of transferring the image onto to the recording sheet 23. The cushion member 17*a* is then compressed along the arcuated surface of the object 32 to be fitted thereon. In accordance with this compression, the ink sheet 18 is brought into tight contact with the original plate 24. If the flash lamp 13 flashes in this state, the light is radiated on the ink sheet 18 through the original plate 24 in the same manner as in the above transfer process. As a result, a portion of the hot-melt ink layer 18*c* corresponding to the original plate image 19*b* or the pen image 19*c* of the original plate 24 is melted, and the melt portion 18*d* is transferred onto the outer surface of the object 32. The transferred image is preferably coated with a transparent coating material so as not to be erased when the outer surface of the object 32 is rubbed. Such a transfer process is not limited to the arcuated surface of a vase. For example, an image can be transferred to the arcuated and spherical surfaces of a bat, a ball, and a club head, a combined surface thereof, and a bent surface of, e.g., a hexagonal pencil. Therefore, when image transfer on sheets bound together like a notebook is to be performed, an image can be clearly transferred even on a portion near an edge portion at which the sheets are bound together. This applies to the formation of an original plate so that an image near an edge portion at which sheets of a notebook or a book are bound together can be clearly transferred, thus properly forming the original plate 24.

Figure 20:
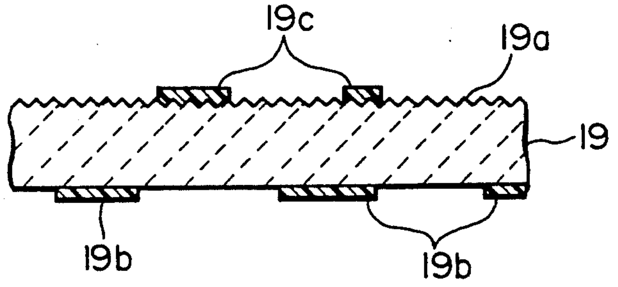

FIG. 20 shows a case wherein images are formed on the original plate sheet 19 by thermal transfer and by 20 handwriting. More specifically, the original plate image 19*b* as part of the original image 22*a* of the original 22 is thermally transferred onto one surface of the original plate sheet 19, and the pen image 19*c* is then formed on the other surface (roughened surface) 19*a* of the original plate sheet 19 with the pen 31. The ink sheet 18 is interposed between the original plate sheet 19 and the object (on which an image is to be transferred) 23 or 32, and the flash lamp 13 is flashed, thereby obtaining a composite image of the original plate image 19*b* and the pen image 19*c* on the object 23 or 32.

In the above-described first embodiment, the ink holder 3 for holding the ink sheet 18 is detachably mounted on the main body 2. However, in the thermal transfer apparatus used for the flash thermal transfer method of the present invention, even if the ink sheet 18 is arranged independently of the main body 2, a transfer process can be efficiently performed. This method will be described below.

Second Embodiment

A second embodiment will be described below with reference to FIGS. 21 to 25.

Figure 21:
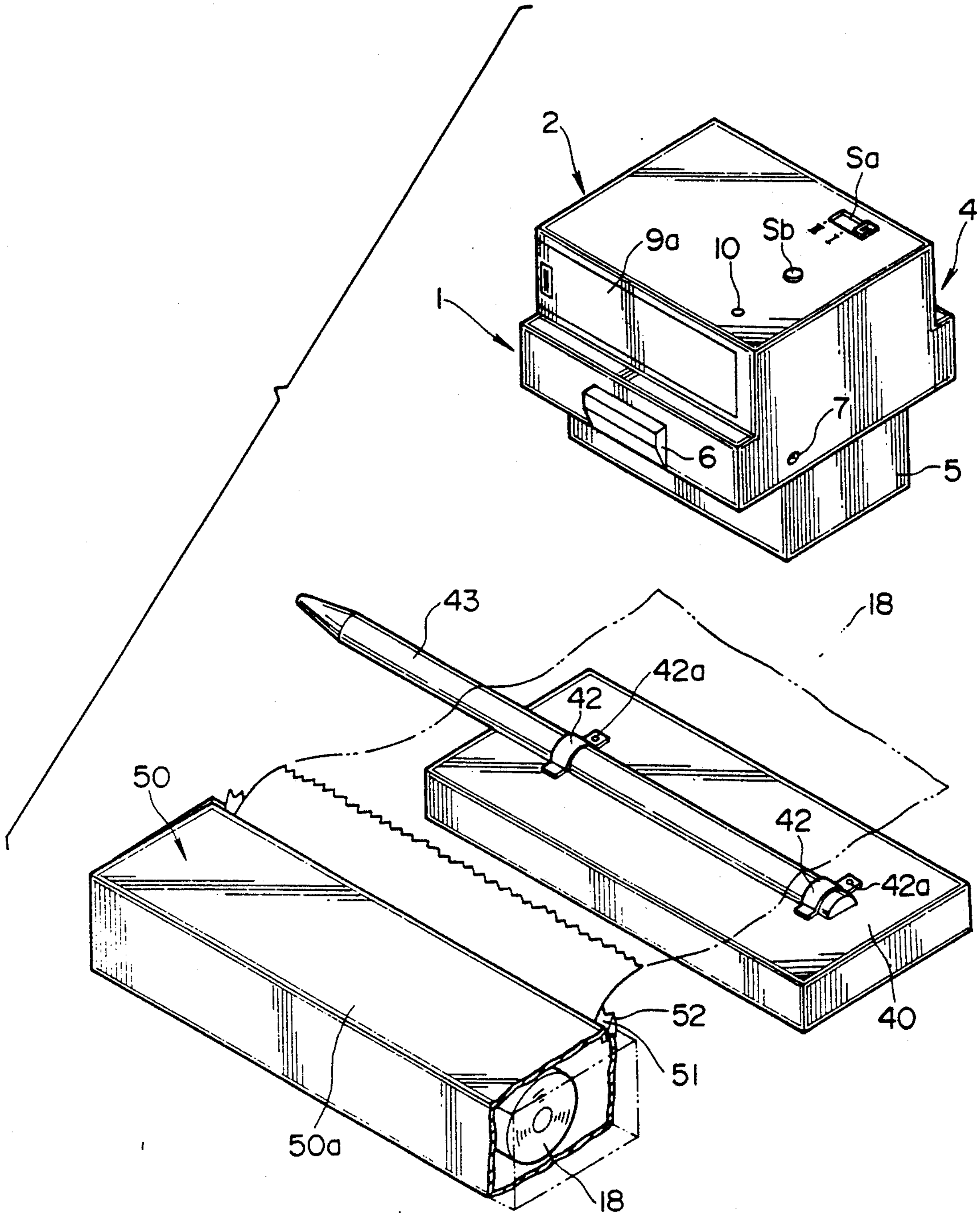

As is apparent from FIG. 21, a flash thermal transfer apparatus 1 of this embodiment comprises a main body 2, an ink holder 50, and a fixing jig 40. The main body 2 is identical with the main body of the first embodiment except that the main body 2 of this embodiment does not have the lock recess portions 11*c* and the restriction portions 11*d* for the ink holder 3. However, as is apparent from the following description, since the main body 2 of this embodiment can be operated in accordance with the utilization method of the first embodiment, a main body identical with the main body of the first embodiment, which has the lock recess portions 11*c* and the restriction portions 11*d*, can be used without any inconvenience.

Figure 22:
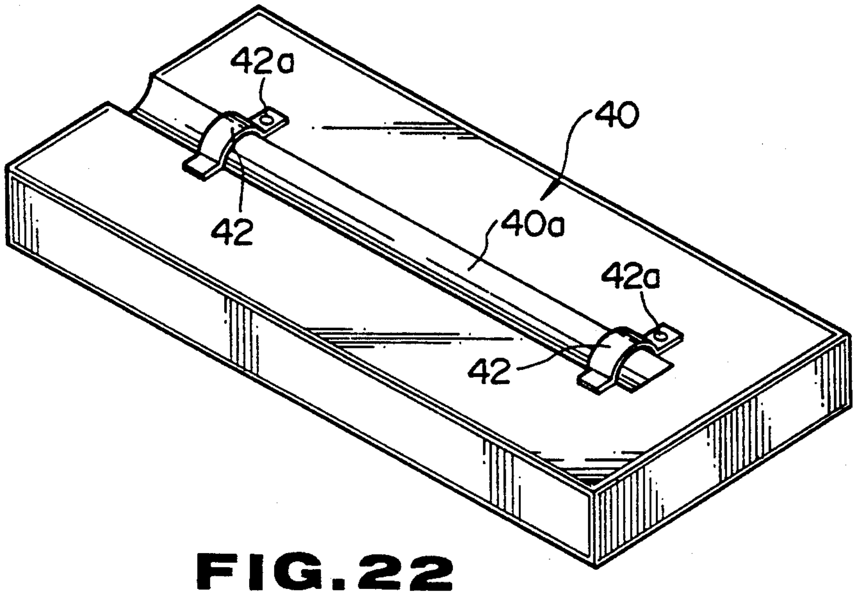

The fixing jig 40 is used to detachably fix a rod-like object 43 (to which an image is to be transferred) such as a pencil or a ballpoint pen thereon. As shown in FIG. 22, the fixing jig 40 has a rectangular base-like shape. A mount groove 40*a* is formed in the upper surface of the jig 40 at the center in its longitudinal direction. Fixing leaf springs 42 are fixed near both the ends of the groove 40*a* by screws 42*a*. The mount groove 40*a* is used for positioning of the object 43 such as a pencil, and is formed as a semi-cylindrical groove. One end (left end) of the mount groove 40*a* is open to the end face of the fixing jig 40, whereas the other end (right end) of the groove 40*a* is closed near the end face of the jig 40. The rear end of the object 43 (right end in FIG. 21) abuts against the other end of the groove 40*a*, thus restricting the longitudinal position of the object 43. The leaf springs 42 are used to fix the object 43 on the fixing jig 40. One end of each leaf spring 42 is fixed on the fixing jig 40 by the screw 42*a*. A portion of each leaf spring 42 which crosses the groove 40*a* is arcuated upward in the form of a semicircle. The object 43 is inserted in this arcuated portion to be elastically urged against the groove 42.

The ink holder 50 stores a rolled ink sheet 18 so as to allow it to be extracted therefrom. As shown in FIG. 21, the ink holder 50 has a rectangular parallelpiped shape. An extraction slit 51 is formed in one longitudinal edge of the ink holder 50, and a cutter 52 for cutting the ink sheet 18 is arranged along the edge opposing the extraction slit 51. The ink holder 50 is made of paper or a synthetic resin, and an upper cover 50*a* is integrally formed therewith so as to be freely opened and closed.

The ink sheet 18 wound in the form a roll is stored in the ink holder 50. This ink sheet 18 is identical with the one used in the first embodiment. The ink sheet 18 is stored in the ink holder 50 by opening the upper cover 50*a* of the ink holder 50. When one end of the ink sheet 18 is extracted out of the ink holder 50, the upper cover 50*a* is closed, thereby obtaining the state shown in FIG. 21.

Figure 24:
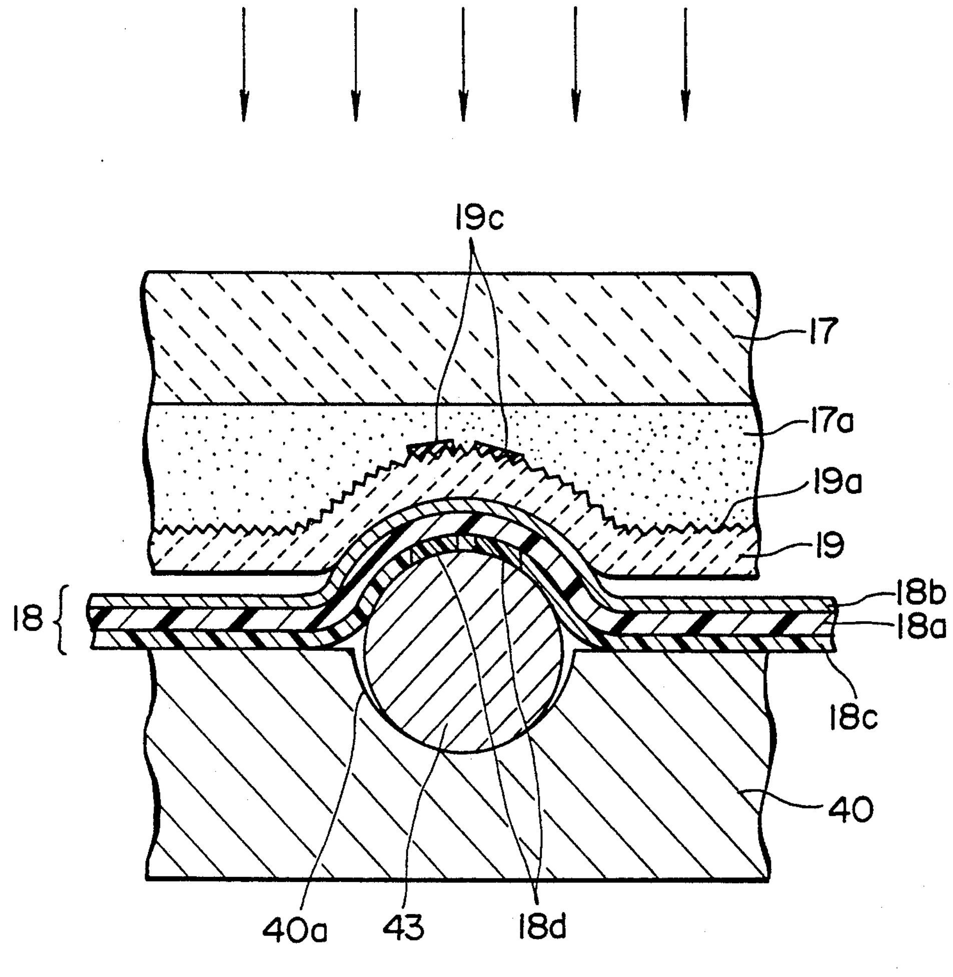
Figure 25:
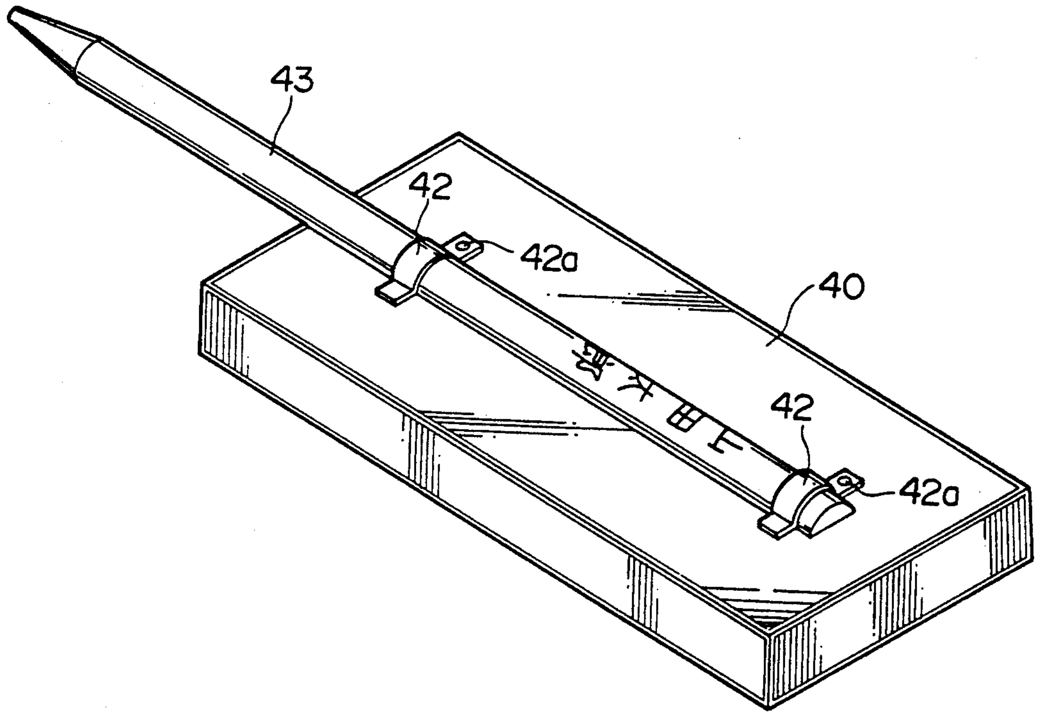

A case wherein a pen image 19*c* on an original plate sheet 19 is transferred onto the object 43 by using the flash thermal transfer apparatus 1 of the second embodiment will be described below with reference to FIGS. 23 to 25.

Figure 23:
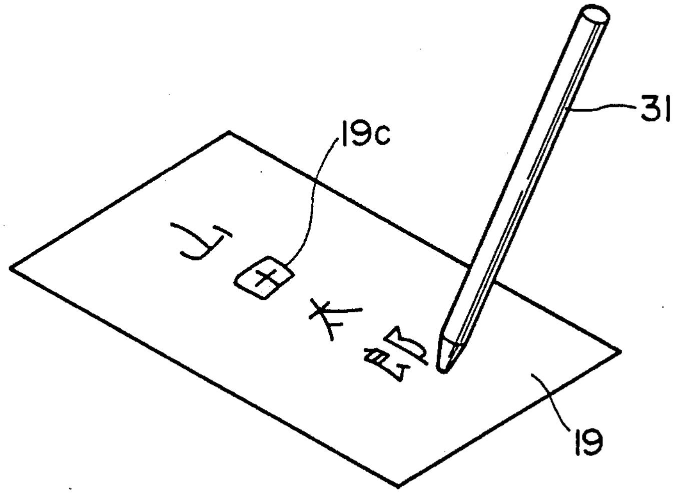

In this case, the pen image 19*c* is formed on the original plate sheet 19 with a pen 31 first, as shown in FIG. 23. The original plate sheet 19 is then attached to the main body 2. The attachment method of the sheet 19 is the same as that of the first embodiment described with reference to FIGS. 3 to 5.

After the original sheet 19 is attached to the main body 2 in this manner, the object 43 such as a pencil is mounted on the fixing jig 40, and the ink sheet 18 is arranged thereon. More specifically, when the object 43 is to be mounted on the fixing jig 40, the object 43 is inserted in the mount groove 40*a* from its open end against the biasing forces of the leaf springs 42 until the end of the object 43 abuts against the other end of the groove 40*a*. As a result, the object 43 is positioned on the fixing jig 40 and is fixed by the leaf springs 42. In this case, since the end of the object 43 abuts against the end of the mount groove 40*a*, when images are sequentially transferred onto a large number of objects 43, the positions of the objects 43 can be always set to be constant. The ink sheet 18 is extracted from the ink holder 50 by a predetermined amount, and the extracted sheet is arranged on the object, as indicated by an alternate long and two short dashed line in FIG. 21. In this case, the ink sheet 18 may be cut by the cutter 52 in a predetermined length.

Subsequently, the main body 2 to which the original plate sheet 19 is attached is arranged on the fixing jig 40 through the ink sheet 18. In this case, a light source chamber 12 of the main body 2 is located at a lower position, and the original plate sheet 19 which is arranged below a transparent member 17 at the lower portion of the light source chamber 12 through a cushion member 17*a* is brought into contact with the ink sheet 18. The main body 2 is then positioned with respect to the fixing jig 40 in such a manner that the pen image 19*c* formed on the original plate sheet 19 opposes an image forming surface of the object 43 through the ink sheet 18. When the main body 2 is pushed from the above in this state, the cushion member 17*a* is compressed in accordance with the shape of the object 43, as shown in FIG. 24. As a result, the original plate sheet 19 and the ink sheet 18*a* are fitted on the image forming surface of the object 43, and their entire surfaces are uniformly pressed against the image forming surface to be brought into tight contact therewith. When the original plate sheet 19 and the ink sheet 18 are brought into tight contact with the object 43, the apparatus is set into a ready state to perform a transfer process.

Subsequently, similar to the first embodiment, a power source switch Sa formed on the upper surface of the main body 2 is turned on. After a light-emitting diode 10 is turned on and the preparation of a flash operation is completed, a flash switch Sb is closed to cause a flash lamp 13 to flash. As a result, a melt portion 18*d* of the ink sheet 18 is transferred onto the object 43 (see FIG. 25).

Modification of Each Member

The flash thermal transfer apparatus of the present invention and the respective members constituting the apparatus can be variously changed and modified on the basis of the gist of the technique disclosed in the invention. Modifications of some of theses members will be described below.

The main bodies 2 of the first and second embodiments can commonly use the ink holders 3 and 50 of the first and second embodiments to be used without any supplementary techniques. That is, the main body 2 of the first embodiment can use the ink holder 50 of the second embodiment without any inconvenience.

In addition, the shape of the main body 2 need not be limited to that of the embodiments. In order to improve portability, a grip portion may be formed, or the battery storage chamber may be designed to be detachable within the technical range of the present invention. The thermal transfer range (the size of the transparent member 17) can be increased to the limitation of the amount of heat energy which can be generated by the flash lamp 13. The expansion of the thermal transfer range is limited by only a charge time for the discharge capacitor, the service life of a power source battery, and a commercial value such as the portability of the main body and the like, but not by any technical factor.

Figure 26:
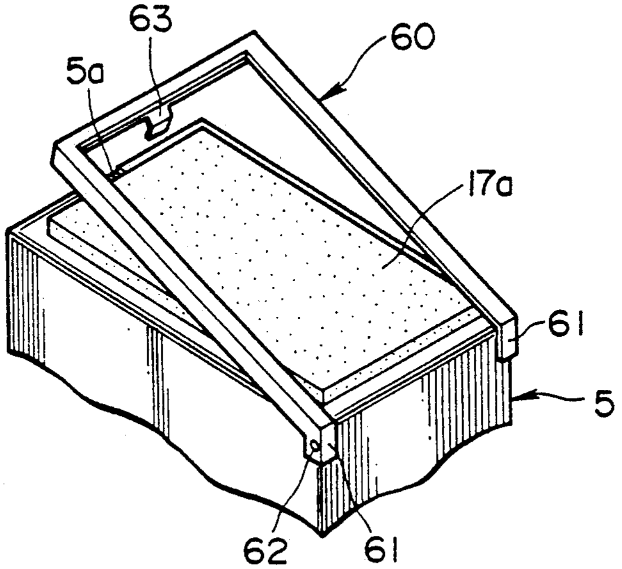

The structure for attachment of the original sheet 19, which is formed in the main body 2, can be further simplified. FIG. 26 shows an example of such a structure.

A cushion member 17*a* is fixed on the upper surface of a transparent member (not shown) of a lower case 5 of a main body 2. A U-shaped hold frame 60 is pivotally mounted on the lower case 5. The hold frame 60 is formed of a thin metal plate or a synthetic resin member. Fulcrum portions 62 extending inward are integrally formed with a pair of leg portions 61 on the opening side, respectively. Recesses (not shown) are formed in the lower case 5 at positions opposite to the fulcrum portions 62. The hold frame 60 is mounted on the lower case 5 so as to pivot on the fulcrum portions 62 in such a manner that the leg portions 61 are expanded outward, and the fulcrum portions 62 are respectively fitted in the recesses of the lower case 5. An engaging piece 63 is integrally formed with the hold frame 60 at a side thereof. The engaging piece 63 is bent at substantially the center thereof and extends toward the lower case 5 side. A shallow groove portion 5*a* is formed in one edge portion of the lower case 5 so as to detachably engage the engaging piece 63. A projection (not shown) is formed in the groove portion 5*a*. An original plate sheet 19 is placed on the upper surface of the cushion member 17*a* while the hold frame 60 is open, as shown in FIG. 26. When the hold frame 60 is closed in this state, a peripheral portion of the original plate sheet 19 is pressed against the bottom surface of the lower case 5 by the respective side portions of the hold frame 60. The engaging piece 63 is then mounted over the projection formed on the lower case 5 to hold the hold frame 60 itself in the closed state. In this modification, an attachment portion for the original plate sheet 19 may be formed on the hold frame 60. In this case, a slidable movement guide portion may be formed in the attachment portion so as to slidably attach the original plate sheet 19 to the hold frame 60.

In the above embodiments, a fine ragged pattern is formed on one surface of the original plate sheet 19. However, the fine ragged pattern is not necessarily required. In addition, the original plate sheet 19 is not limited to a resin sheet. In place of the resin sheet, paraffin paper can be used as a preferable example.

According to JIS Z 1510, paraffin paper is obtained by uniformly coating or infiltrating a coating agent mainly consisting of paraffin on or in glassine paper, *mozoshi*, or kraft paper. In this case, paraffin includes methane series hydrocarbons or paraffin wax. However, the above definitions should be broadly interpreted as long as they are fitted to the embodiments and object of the present invention. That is, any original plate sheet obtained by uniformly coating or infiltrating a coating agent having properties equivalent to those of paraffin on or in at least one surface of paper as a base is fitted to the object of the present invention.

In addition, if a hot-melt adhesive is coated on one surface of tracing paper or the like, it can be used as an original plate sheet. In this case, the surface on which the hot-melt adhesive is coated is used as a surface on which an original image is to be thermally transferred.

Figure 27:
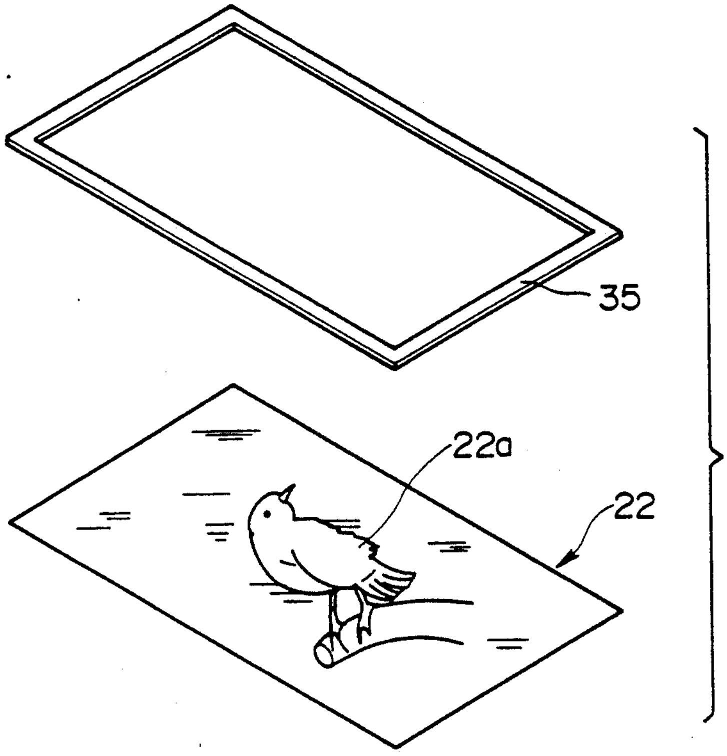

Since the original plate sheet 19 is very thin, attachment of the sheet 19 to the main body 2 is difficult. If the original plate sheet 19 easily bends and is difficult to insert, in order to facilitate handling of the sheet 19, a frame-like reinforcing sheet 35 may be integrally bonded to the sheet 19, as shown in FIG. 27. The frame-like reinforcing sheet 35 has substantially the same outer shape as that of the original plate sheet 19, and an opening is formed at its middle portion. FIG. 27 shows a case wherein the frame-like reinforcing sheet 35 is bonded to a surface opposite to a pen image surface of the original plate sheet 19. However, the frame-like reinforcing sheet 35 may be bonded to the surface of the original plate sheet 19 on which a transferred ink image 19*a* is formed. Fixing means is not limited to bonding. For example, pins may be formed on the frame-like reinforcing sheet 31, and holes may be formed in the original plate sheet 19 so that the pins and the holes are engaged with each other. In addition, a slit or an elastic engaging piece may be formed in or on the reinforcing sheet 35 so as to insert the original plate sheet 19 therein.

Figure 28:
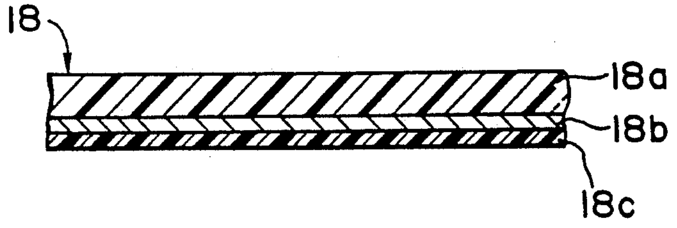

As the ink sheet 18, a sheet obtained by sequentially stacking a reflecting layer 18*b* and a hot-melt ink layer 18*c* on one surface of a base film 18*a* as shown in FIG. 28 may be used. In this case, however, a film having high transparency must be used as the base film 18*a*.

Figure 30:
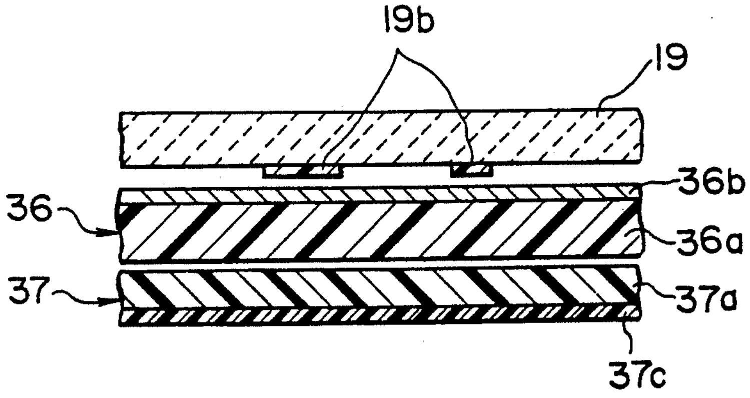
Figure 29:
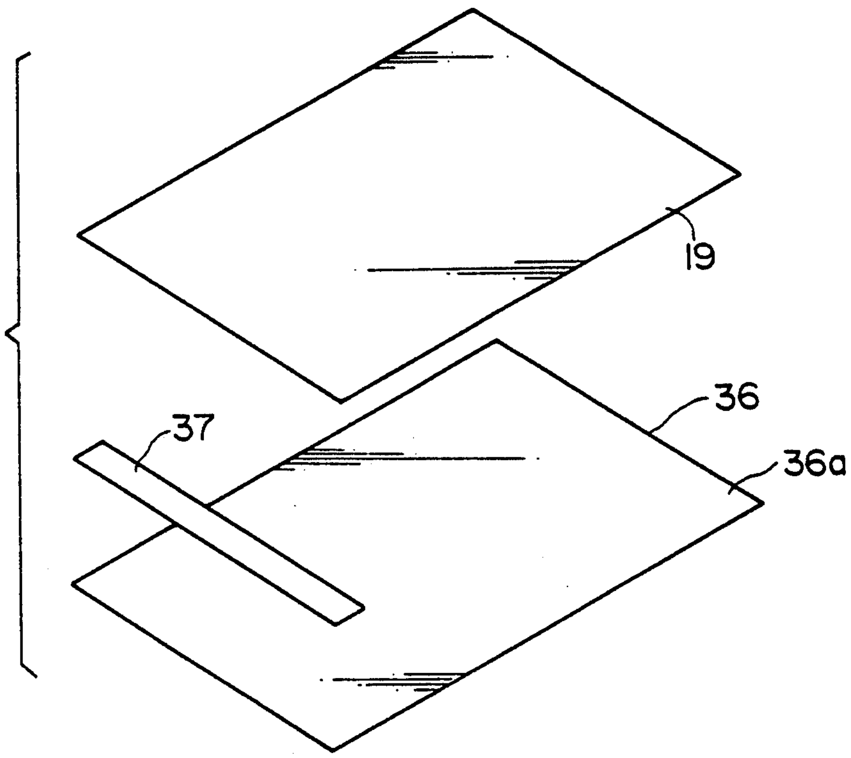

In addition, the reflecting layer 18*b* may be formed on a sheet independent of the ink sheet 18. FIGS. 29 and 30 show such a modification. In this modification, an ink sheet 37 has only a hot-melt ink layer 37 on the lower surface of a base film 37*a*. A reflecting layer 36*b* is deposited on one surface of a base sheet 36*a* of a reinforcing sheet 36. The reinforcing sheet 36 and the original plate sheet 19 are bonded to each other by a double-coated adhesive tape 37 at only one edge portion. An original plate image 19*b* formed on an original plate sheet is brought into tight contact with the reflecting layer 36*b* of the reinforcing sheet 36. In this modification, since only the ink sheet 37 is required to be extracted up to an unused portion upon completion of one transfer process, the reflecting layer 36*b* need only have an area equal to that of an original plate.

Moreover, a transparent member 17 need not be flat. If an object to which an image is transferred has an arcuated surface like a cylindrical or spherical shape such as the object 32 or 43, the outer surface of the transparent member 17 may be formed into an arcuated surface beforehand in accordance with the shape of such an object, thereby effectively executing the present invention.

In addition to the above-described modifications, various changes and modifications can be made within the spirit and scope of the invention.

As has been described above, according to the flash thermal transfer method of the present invention, a cushion member having transparency is arranged between an original plate sheet and a transparent member, and a flash lamp can be turned on while the original plate sheet and an ink sheet are brought into tight contact with an object (to which an image is transferred) by compressing the cushion member. Therefore, a transfer process can be facilitated, and a clear transfer image can be obtained. In addition, the object is not limited to a flat one such as a recording sheet. An image can be transferred onto various objects regardless of a shape and a size. For example, objects having arcuated surfaces, such as a bat, a vase, and a pencil, and objects which cannot be moved, such as a wall and a pillar can be used. Moreover, since a wet ink such as an ink liquid is not used, smearing during an operation can be prevented. Thus, the present invention can provide various advantages.

What is claimed is:

1. A flash thermal transfer method, comprising the steps of:

providing an object on which image transfer is to be performed, placing, on said object, a transfer ink sheet including a base film having a thickness of about 5 to 50 μm, a hot-melt ink layer formed on one surface of said base film and a reflecting layer on the other surface of said base film, and bringing said hot-melt ink layer into contact with said object;

providing a light-transmissive original sheet made of a transparent plastic having a thickness of about 10 to 80 μm and mounted with an ink image made of material with infrared absorbing properties including carbon powder and binder;

placing said surface of said original sheet on said transfer ink sheet facing said ink image to said reflecting layer;

placing a light-transmissive cushion member made of a foamed plastic on said original sheet;

placing a light-transmissive plate on said cushion member; and compressing said cushion member by applying an external force to said light-transmissive plate, and causing a flash lamp to flash from above said plate while said transfer ink sheet is in contact with said object, thereby causing a hot-melt ink image corresponding to said ink image formed on said original sheet to be melted and transferred onto said object.

2. A method according to claim 1, wherein said original sheet comprises a resin sheet having at least one roughened surface.

3. A method according to claim 1, wherein said original sheet comprises paraffin paper.

4. A method according to claim 1, wherein said original sheet, said cushion member, and said light transmissive plate are simultaneously pushed toward said object to compress said cushion member.

5. A method according to claim 1, wherein said transfer ink sheet, said original sheet, said cushion member, and said light transmissive plate are simultaneously pushed toward said object to compress said cushion member.

6. A flash thermal transfer method, comprising the steps of:

providing an object having a non-planar deformed surface;

providing sheets one of which has a thickness of about 10 to 80 μm and has an ink image made of material including carbon powder and binder, and another one of which has a thickness of about 5 to 50 μm and includes a hot-melt ink layer to be transferred to said object and layer means for preventing infrared rays from impinging on said hot-melt ink layer;

providing a light-transmissive cushion member made of a foamed plastic;

providing a light-transmissive hard plate;

arranging said sheet including the hot-melt ink layer thereon, said sheet with the ink image thereon, said cushion member and said hard plate in that order on said object;

pushing said sheets, said cushion member and said hard plate for bringing said sheets into tight contact with said object; and causing a flash lamp to radiate infrared rays from above said hard plate while keeping said cushion member compressed, whereby only portions of said hot-melt ink layer corresponding to said ink image are melted and are transferred onto said object.

* * * * *